United States Patent [19]

Suzuki et al.

[11] Patent Number: 5,029,961
[45] Date of Patent: Jul. 9, 1991

[54] OPTICAL FIBER COUPLER AND PROCESS FOR MANUFACTURING SAME

[75] Inventors: Fumio Suzuki, Chiba; Tohru Arikawa, Narashino; Noboru Kawakami, Sakura; Yoshio Kikuchi, Chiba; Kuniharu Himeno, Sakura; Osamu Fukuda, Narashino, all of Japan

[73] Assignee: Fujikura Ltd., Tokyo, Japan

[21] Appl. No.: 431,676

[22] Filed: Nov. 2, 1989

Related U.S. Application Data

[63] Continuation of Ser. No. 126,999, Nov. 30, 1987, abandoned.

[30] Foreign Application Priority Data

| Nov. 28, 1986 | [JP] | Japan | 61-284017 |
| Mar. 11, 1987 | [JP] | Japan | 62-56087 |
| Mar. 23, 1987 | [JP] | Japan | 62-68489 |
| Apr. 7, 1987 | [JP] | Japan | 62-84982 |
| Jun. 8, 1987 | [JP] | Japan | 62-142456 |

[51] Int. Cl.$^5$ ............................................. G02B 6/26
[52] U.S. Cl. .............................. 350/96.15; 350/96.33; 350/320
[58] Field of Search ............... 350/96.15, 96.16, 96.20, 350/96.21, 96.29, 96.30, 96.33, 320

[56] References Cited

U.S. PATENT DOCUMENTS

| 4,478,489 | 10/1984 | Blankenship et al. | 350/96.30 |
| 4,493,528 | 1/1985 | Shaw et al. | 350/96.15 |
| 4,664,473 | 5/1987 | Gannon | 350/96.33 |
| 4,669,814 | 6/1987 | Dyott | 350/96.15 |
| 4,753,497 | 6/1988 | Fujii et al. | 350/96.15 |
| 4,861,127 | 8/1989 | Failes | 350/96.15 |

OTHER PUBLICATIONS

Bergh et al, "Single-Mode Fibre Optic Directional Coupler", *Electronics Lett.*, vol. 16, No. 7, Mar. 1980, pp. 260-261.

*Primary Examiner*—John D. Lee
*Attorney, Agent, or Firm*—Sprung Horn Kramer & Woods

[57] ABSTRACT

An optical fiber coupler is disclosed, which comprises two polished substrates each of which comprises a grooved substrate having a polished surface on the open side end thereof and adapted to hold therein an optical fiber and an optical fiber comprising a core, a cladding and two stress-applying parts arranged in the cladding so as to sandwich the core, a part of the optical fiber being polished off such that the polished surface of the fiber is close to the core so as to allow leakage of light power propagating in the core to the outside, the polished optical fiber being embedded in the grooved substrate and fixed thereto in such a manner that the polished surface of the grooved substrate is in flush with the polished surface of the polished optical fiber, with the two polished substrates being in close contact with each other at the polished surfaces thereof to allow coupling of light power, wherein said polished optical fiber is of a construction such that the polished surface thereof is perpendicular to the polarization principal axis X defined as the direction connecting the centers of said stress-applying parts. Also, a process for manufacturing the optical fiber coupler is disclosed.

11 Claims, 14 Drawing Sheets polarization crosstalk versus misalignment between principal axes

OPTICAL FIBER COUPLER AND PROCESS FOR MANUFACTURING SAME

This application is a continuation, of application Ser. No. 126,999, filed Nov. 30, 1987 (abandoned).

BACKGROUND OF THE INVENTION

This invention relates to optical fiber couplers for division and junction of light in optical communication, optical fiber sensors, etc., more particularly to polarization-maintaining optical fiber couplers which enables division (bifurcation) of junction (coupling) of light with maintaining the direction of polarization of light.

Conventional examples of optical fiber couplers which can be used for the above purpose include polished optical fiber couplers as shown in FIGS. 1, 2, 3a and 3b, in which reference numeral 1 designates an optical fiber coupler, 2a and 2b polished optical fibers. The optical fiber coupler 1 comprises polished optical fibers 2a and 2b and two prismatic glass blocks or pillars 2a and 3b to which portions of the polished optical fibers are fixed, the glass blocks 3a and 3b being bonded or connected to each other with bringing the polished portions 4a and 4b of the polished optical fibers 2a and 2b in contact with each other. The glass blocks 3a and 3b are each provided with a groove 5 along the longitudinal axis thereof in which the polished optical fiber 2a or 2b is held or embedded. The bottom of the groove is shaped in an arcuate form or slightly convexed so that the polished optical fibers embedded therein can be given a suitable bending as shown in FIG. 2. The polished optical fibers 2a and 2b have polished portion or area 4a and 4b, respectively, which are brought into contact with each other at a contact portion 6 where cores 7a and 7b, respectively, of the polished optical fibers 2a and 2b are positioned close to each other so that light power transmitted in the core of one polished optical fiber (e.g., the core 7a of the optical fiber 2a) leaks to the outside and enters the core of another polished optical fiber (the core 7b of the optical fiber 2b) to achieve junction or coupling of light power. That is, incident light power which entered in an incident port of the optical fiber 2a is divided at the contact portion 6 and a part thereof is transmitted in the other polished optical fiber 2b, and divided or bifurcated light powers at a predetermined output bifurcation ratio are obtained from an output port 9 of the polished optical fiber 2a and a divisional or branch output side port 10 of the polished optical fiber 2b.

The optical fiber coupler 1 is manufactured in fabrication steps as shown in FIGS. 4 to 7. That is, at first, a groove 5 for holding or embedding an optical fiber is formed on a rectangular parallelepiped substrate 3 made of a transparent material such as quarts based glass, multi-component glass, fluoride glass, etc. The groove 5 is formed by grinding the rectangular parallelepiped substrate 3 on one of surfaces having the largest area (b×c) (FIG. 4), say surface A, along the length c or in the longitudinal direction with respect to the substrate 3. The cross-section of the groove 5 is U-shaped in FIG. 4 but may be in an other form, e.g., square or rectangular.

In the above operation, a grooved substrate or glass block 3 as shown in FIG. 4 is prepared. Then, as shown in FIG. 5, an optical fiber 2 is inserted or placed in the groove 5 of the grooved substrate 3. The optical fiber 2 comprises a core 7 and a cladding 11 surrounding the core 7. In the case of stress-applying polarization-maintaining optical fibers, the optical fiber 2 further comprises two stress-applying parts 12, 12 arranged so as to sandwich the core 7 therebetween. In the following, description will be made with respect to stress-applying polarization-maintaining optical fibers (hereinafter, sometimes referred to as "optical fibers" or "fibers" for simplicity), however, the same explanation is valid for non-stress-applying polarization-maintaining optical fibers.

When inserting a polarization-maintaining optical fiber in the groove 5 it is important to align the polarization principal axis of the fiber in the direction of the depth of the groove. There are two polarization principal axes in the core of each stress-applying polarization-maintaining optical fiber. Generally, the axis connecting the centers of the stress-applying parts to each other is called "X-axis" and the axis at right angles to X-axis called "X-axis". In the case shown in FIG. 3b, Y-axis is aligned in the direction of the depth of the groove 5. To align the polarization principal axis with the direction of the depth of the groove, that is, the direction of polishing is very important in the manufacture or fabrication of polarization-maintaining optical fibers. Disagreement for misalignment of the polarization principal axis between the polished optical fibers in a polarization-maintaining optical fiber will result in the deterioration of polarization maintenance characteristics of the fiber.

Optical fibers are fabricated by pouring or filling an adhesive 13 into the groove 5 followed by allowing the adhesive to cure. By this, the optical fiber 2 is fixed to the glass block 3 (FIG. 6). The amount of light power which leaks depends on the amount or degree of polishing at the polished part 4, and various types of glass blocks 3a, 3b with different amounts of polishing are fabricated depending on the purposes for which the fiber couplers are used. Then, the two glass blocks 3a, 3b are bonded or connected to each other so that polished parts 14a and 14b of the glass blocks 3a and 3b, respectively, are in contact with each other through an index matching oil. The relative position of one glass block with respect to another, i.e., the position of the glass block 3a with respect to the glass block 3b is adjusted by monitoring light power emitted from a light source 16 using light detectors 17 and 17 connected to output port 9 and branch output port 10, respectively, and translating one of the glass blocks or both of them so as to form relative positional change therebetween until a position is reached where a predetermined output bifurcation ratio is exactly obtained (FIG. 1). Then, the glass blocks 3a and 3b are fixed to each other with an adhesive, etc. to form an optical fiber coupler 1.

Further, there have heretofore been provided fused optical fiber couplers obtained by fusing under heating and drawing two polarization-maintaining optical fibers polarization-maintaining optical fibers which allows junction of light power at the fused parts. However, with this type of conventional optical fibers no high performance optical fiber coupler that gives accurate output split ratio can be prepared with ease. More particularly, upon fabrication of optical fiber couplers by melt-fusion, it is necessary to very precisely adjust the position of the core of each fiber so that the completed optical fiber coupler can have a predetermined output bifurcation ratio. However, the above-described conventional fiber couplers are so constructed that a part of each optical fiber is melt-fused and elongated to render the core of one optical fiber close to that of another, with the adjustment of the position of the cores being carried out depending on the degree of elongation, resulting in that it is difficult to perform accurate adjustment of the cores upon fusing.

It is also necessary to accurately control the amount of polishing at polished parts 4, 4 in optical fibers fabricated by polishing in order to obtain a desired output bifurcation ratio. For example, in order to render the output bifurcation ratio smaller at the branch output port 10 (cross path) and larger at the output side port 9 (straight path), optical fiber couplers must be fabricated using polished optical fibers 2a and 2b whose polishing amount at the polished parts 4, 4 is small thus making the distance L between the surface of the polished part 4 and the center of the core (FIGS. 3a and 3b) small. On the other hand, when it is intended to obtain fiber couplers with its bifurcation ratio being set up such that the ratio is larger on the branch output port 10 than on the straight output port 9 polished optical fibers 2a and 2b must be those with a large amount of polishing so as to make the distance L small.

For the above reason, the conventional manufacturing process for the fabrication of optical fiber couplers 1 is very complicated and the efficiency thereof is low. Since the amount or degree of polishing must be accurately controlled sometimes there occurs many unacceptable products with too much polishing, thus decreasing the percentage of acceptable products.

In order for optical fiber couplers having the above construction to have desirable characteristics such as accuracy in coupling ratio of light lower, low coupling loss of light power, etc. the surface A of the substrate 3 on the side where the groove 5 is provided must have very delicate flatness. As to the surface A, it is necessary to accurately control not only its flatness but also the amount of polishing, i.e., the distance L between the surface A and the core 7. It has heretofore been difficult to polish the substrate in such a manner that both the above requirements are met since various factors adversely affect the quality of polished surface. For example, minute protrusion and depression in a polishing plate tend to cause unevenness in the surface A and the polished part 14 as shown in FIGS. 8 and 9. The polished part 14 with uneven surface is undesirable since an index matching oil 15 which intervenes between the surfaces A is localized, thus giving various adverse influences on the resulting optical fiber coupler such as those on the refractive index from the optical viewpoint and local concentration of stress due to expansion and contraction on the polished part 14 from mechanical viewpoint, resulting in drastic change in the coupling characteristics of the optical fiber coupler due to temperature change or other factors, which in turn deteriorates the antiweatherability or environment resistance of the coupler.

The degree of the deterioration of the environment resistance is substantially proportional to the area of the uneven surface A being in contact. The larger the area the more deteriorated the environment resistance. The magnitude of unevenness or protrusion and depression in the polished part does not give a serious influence on the environment resistance when it is smaller than about half the wavelength of light used (about 0.5 micrometers) but greatly deteriorates environment resistance when it is larger than the size in the order of about the wavelength (about 1 micrometer). On the other hand, it is the more advantageous the larger the area of another surface of the substrate which is in the side opposite to the surface A (hereinafter, referred to as "surface B") since stability upon holding the substrate by a holding jig (not shown) and thus accuracy or precision of polishing are improved.

Further disadvantage of the conventional polishing process is that as shown in FIGS. 6 and 7, the direction 27 of polishing is perpendicular to polarization principal axis 26 and as the result it has been difficult to exactly align polarization principal axis Y in the direction of polishing since usually alignment of polarization principal axes is conducted by observing or detecting the position of the stress-applying part under microscope in the direction of polishing and in this case it is difficult to perform precise alignment because of the stress-applying parts being arranged at right angles to the direction of the observation as shown in FIG. 6. Accordingly, when polarization-maintaining optical fiber couplers are fabricated using the polished optical fibers which were prepared in the manner as shown in FIGS. 6 and 7, the resulting coupler hardly have acceptable polarization maintenance characteristics. Another serious problem is that cracks 28 occur in the stress-applying parts 12. There is always a contractile force directed toward the center in the stress-applying part or zone. Therefore, the stress-applying part is susceptible to shoes from outside and suffer a high possibility of the occurrence of cracks 28 upon polishing or lapping. Once cracks 28 occur the polarization maintenance characteristics of the coupler is greatly deteriorated. What is worse, polishing both of the two stress-applying parts makes the stress-applying effect on the core 8 is greatly reduced.

SUMMARY OF THE INVENTION

It is an object of this invention to obviate the above-described disadvantages of the prior arts.

Another object of this invention is to provide a high performance optical fiber coupler which enables exact or precise control of the output bifurcation ratio of the coupler.

Still another object of this invention is to prevent the occurrence of cracks and maintain the stress-applying effect in the stress-applying parts or zone in stress-applying, polarization-maintaining optical fiber couplers.

Yet another object of this invention is to provide optical fiber couplers which can be produced by simplified process in a good yield of acceptable products.

Further object of this invention is to provide a process for manufacturing the above-mentioned optical fiber couplers.

As the result of extensive investigation it has now been found that the above-described problems are overcome by using stress-applying polarization-maintaining optical fibers which has been polished or lapped in the direction of the polarization principal axis to remove a predetermined amount of the fiber, and this invention is based on this finding.

Therefore, in one aspect, this invention provides an optical fiber coupler comprising two polished substrates each of which comprises a grooved substrate having a polished surface on the open side end thereof and adapted to hold therein an optical fiber and an optical fiber comprising a core, a cladding and two stress-applying parts arranged in the cladding so as to sandwich the core, a part of the optical fiber being polished off such that the polished surface of the fiber is close to the core so as to allow leakage of light power propagating in the core to the outside, the polished optical fiber being embedded in the grooved substrate and fixed thereto in such a manner that the polished surface of the grooved substrate is in flush with the polished surface of the polished optical fiber, with the two polished substrates being in close contact with each other at the polished surfaces thereof to allow coupling of light power, wherein the polished optical fiber is of a construction such that the fiber lacks one of the two stress-applying parts as a result of polishing in the direction of polarization principal axis defined as the direction connecting the center of one of the stress-applying parts to that of another.

In another aspect, this invention provides a process for manufacturing a stress-applying polarization-maintaining optical fiber coupler, comprising providing, on one hand, a stress-applying polarization-maintaining optical fiber comprising a core in the center of the fiber, a cladding surrounding the core and a pair of stress-applying parts arranged in the cladding so as to sandwich the core, and on the other hand, a grooved substrate adapted for holding therein the optical fiber, inserting the optical fiber in the groove of the grooved substrate, fixing the optical fiber to the grooved substrate in such a manner that one of the stress-applying parts is placed so as to face the bottom of the groove in the grooved substrate and the other is placed so as to face toward the open side of the grooved substrate, polishing the substrate having held therein the optical fiber in the direction from the open side to the bottom of the groove to remove the stress-applying part positioned close to the open side of the grooved substrate and expose a part close to the core, thus forming a polished substrate having a polished surface, and connecting a pair of the thus-formed polished substrates by bringing them in contact with each other on the polished surfaces thereof.

In a still another aspect, this invention provides an optical fiber coupler comprising two polished substrates each of which comprises a grooved substrate having a polished surface on the open side end thereof and adapted to embed therein an optical fiber and an optical fiber comprising a core and a cladding surrounding the core, a part of the optical fiber being polished off such that the polished surface of the fiber is close to the core so as to allow leakage of light power propagating in the core to the outside, the polished optical fiber being embedded in the grooved substrate and fixed thereto in such a manner that the polished surface of the grooved substrate is in flush with the polished surface of the polished optical fiber, with the two polished substrates being in close contact with each other on the polished surfaces thereof to allow coupling of light power, wherein the polished optical fiber is of a construction such that the area of the surface on the side where the groove is provided is smaller than the area of the surface on the opposite side.

In a yet another aspect, this invention provides a stress-applying polarization maintaining optical fiber coupler comprising two polished substrates each of which comprises a grooved substrate having a polished surface on the open side end thereof and adapted to hold therein an optical fiber and an optical fiber comprising a core and a cladding surrounding the core, a part of the optical fiber being polished off such that the polished surface of the fiber is close to the core so as to allow leakage of light power propagating in the core to the outside, the polished optical fiber being embedded in the grooved substrate and fixed thereto in such a manner that the polished surface of the grooved substrate is in flush with the polished surface of the polished optical fiber, with the two polished substrates being in close contact with each other on the polished surfaces thereof to achieve coupling of light power, wherein the optical fiber coupler is attached to a sliding device comprising a fixing member and a movable member and one of the polished optical fibers is fixed to a fixing member and the other is in slidable contact with the fixing member and is slidable in the direction of the fiber axis.

BRIEF DESCRIPTION OF THE DRAWINGS

FIG. 4 is a perspective view of a grooved substrate used in the optical fiber coupler shown in FIG. 3a;

DESCRIPTION OF PREFERRED EMBODIMENTS

This invention will be described in greater detail with reference to the accompanying drawings showing preferred embodiments.

Figure 10:
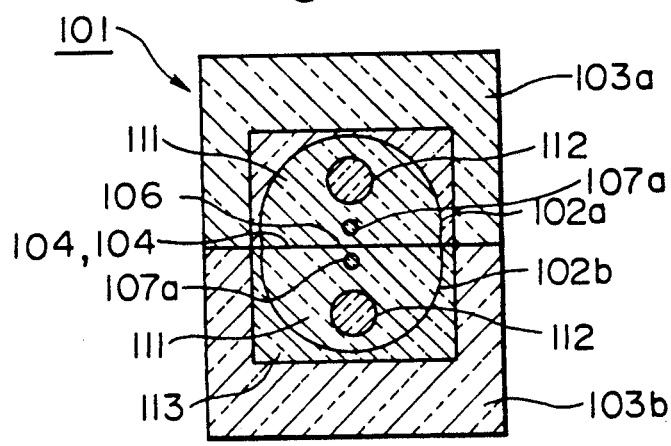
FIG. 10 is a cross-sectional view of the optical fiber coupler produced according to an embodiment of the process of the manufacture of this invention.

FIG. 10 shows an example of the optical fiber coupler produced by the process for manufacturing optical fiber coupler according to this invention. In FIG. 10, reference numeral 101 designates an optical fiber coupler. The optical fiber coupler 101 is comprised by polished optical fibers 102a and 102b, and prismatic substrate 103a and 103b having fixed thereto portions of the polsihed optical fibers 102a and 102b, respectively, with the substrates 103a and 103b being in contact with each other on polished surfaces 114a and 114b of the polished optical fibers 102a and 102b, respectively.

In a contact part 106 where the polsihed surfaces 114a and 114b are in contact with each other, cores 107a and 107b of the polished optical fiber 102a and 102b are close to each other, and light power which propagates in the core 107a of one polished optical fiber 102a partly leaks to the outside and enters into the core 107b of another polished optical fiber 102b, thus achieving coupling of light power. That is, a part of the incident light propagating in the polished optical fiber 102a is birfurcated at the contact part 106 to the other polsihed optical fiber 102b and divided light power is obtained from the output side port of the polished optical fiber 102a (straight path) and from the branch output side port of the polished optical fiber 102b at a predetermined output bifurcation ratio therebetween.

Figure 11:
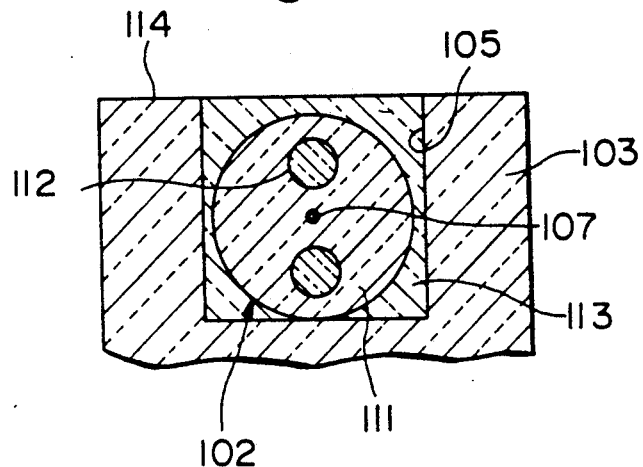
FIG. 11 is a cross-sectional view illustrating the state in which the optical fiber is embedded in the groove of the grooved substrate.

The optical fiber coupler 1 is fabricated as follows. At first, a stress-applying polariation-maintaining optical fiber (hereinafter, sometimes referred to simply as "optical fiber") 102 is inserted in a grooved substrate 103 made of a transparent material, e.g., quartz, more particularly in a groove 105 of the grooved substrate 103 (FIG. 11). The optical fiber 102 includes a core 107 positioned in the center of the fiber and cladding 111 surrounding the core 107 as well as two stress-applying parts or zones 112 sandwiching the core 107. The stress-applying parts 112 is made of, for example, $B_2O_3$-doped $SiO_2$ when $SiO_2$ is used as the material of the cladding 111. As the result, the stress-applying parts 112 have a refractive index lower than that of the cladding and when the optical fiber 102 is viewed by eye from the side thereof they appear darkened.

Then, the optical fiber 102 is positioned at the groove 105 such that one of the stress-applying parts 112 is directed upward and in this state an adhesive 113 is poured in the groove 105 and cured. By so doing, a portion of the optical fiber 102 is fixed to the substrate 103 (FIG. 11).

Figure 12:
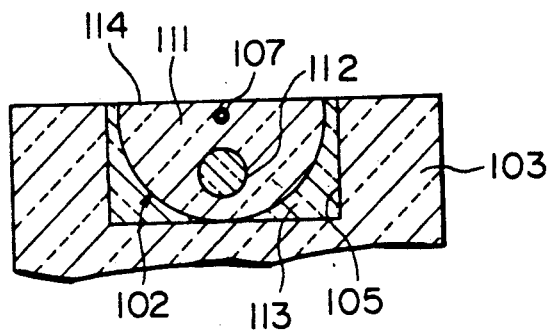
FIG. 12 is a cross-sectional view of a polished substrate obtained by polishing a glass block holding therein the optical fiber shown in FIG. 11.

Thereafter, a surface 114 of the substrate 103 on the side where the optical fiber 102 is embedded, i.e., upper side surface in FIG. 11 is polished. The polishing is carried out to such an extent that the upper stress-applying part 112 is removed to expose a part near the core 107, in other words, light power propagating in the core 107 of the optical fiber 102 leaks partly in a predetermined ratio (FIG. 12).

The substrates 103 and 103b prepared as stated above are connected or bonded to each other so that the respective polished surfaces thereof 114 are brought in contact with each other to obtain the optical fiber coupler 101.

Figure 1:
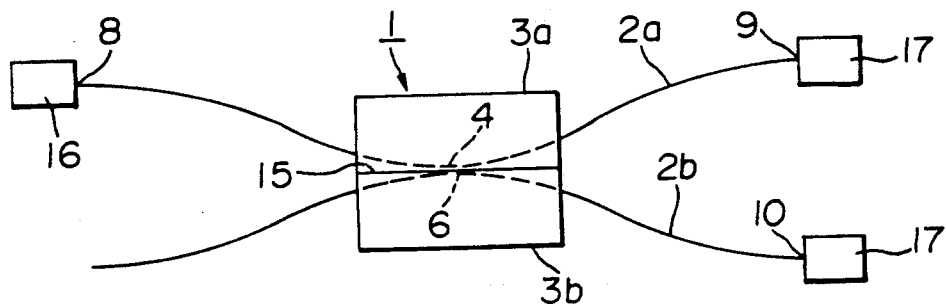
FIG. 1 is a schematic illustration of conventional optical fiber coupler.

Upon bonding the substrates, the output bifurcation ratio of the resulting optical fiber coupler can be adjusted precisely or accurately by fixing the substrates 103a and 103b after adjusting the positions of the substrate 103a and 103b according to the conventional method illustrated in FIG. 1.

In the above-described process for manufacturing optical fiber couplers, the optical fiber 102 is inserted in the groove 105 with one of the stress-applying parts 112 being faced toward the bottom of the groove 105 and fixed to the substrate the polarization principal axis X stand in a line with the direction of observation, which makes it possible to exactly align the polarization principal axis X with the direction of polishing. Then, the substrate 103 is polished in the direction from above the groove 105 toward the bottom thereof to form a polished surface 114 on the optical fiber 102 with removing another stress-applying part to expose a part near the core 107, followed by connecting the polished substrates 103a and 103b to each other such that the respective polished surfaces 114a and 114b are brought in contact with each other to thereby form the optical fiber coupler 101. Therefore, misalignment between the polarization principal axes of the cores 107a and 107b, respectively, can be minimized, which enables production of optical fiber couplers having excellent polarization-maintaining ability. For example, the amount of misalignment of the axes can be reduced to a level not higher than 6 [deg] which is necessary to keep crosstalk at a level not higher than −20 dB (cf. Experiment 1 hereinbelow).

Figure 13:
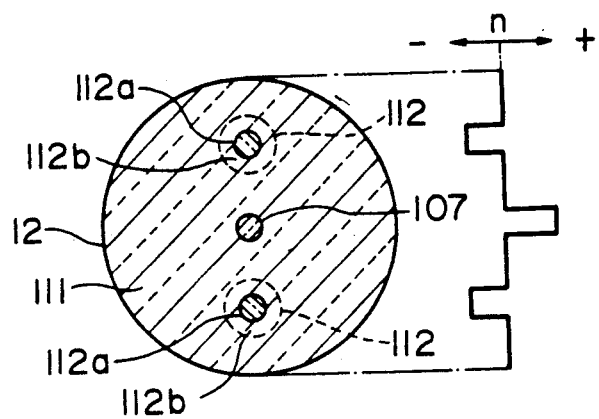
FIG. 13 is an illustration of the refractive index profile of an optical fiber comprising stress-applying parts composed of a central part and a refractive index-controlling part.
Figure 14:
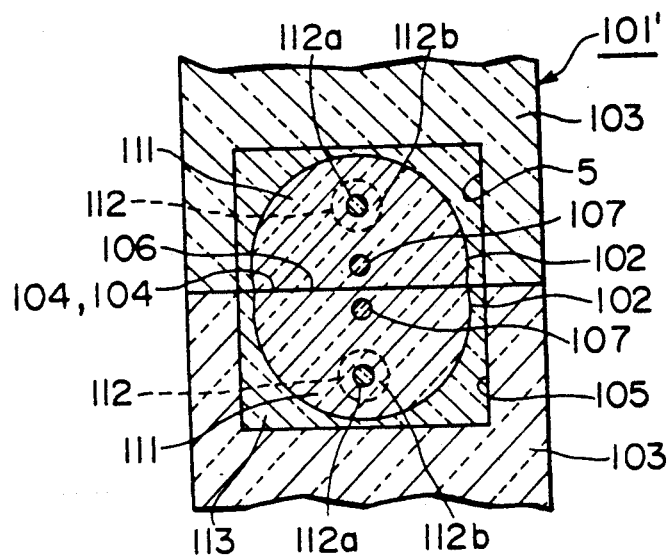
FIG. 14 is a cross-sectional view of an optical fiber coupler produced using the optical fiber shown in FIG. 13.
Figure 15:
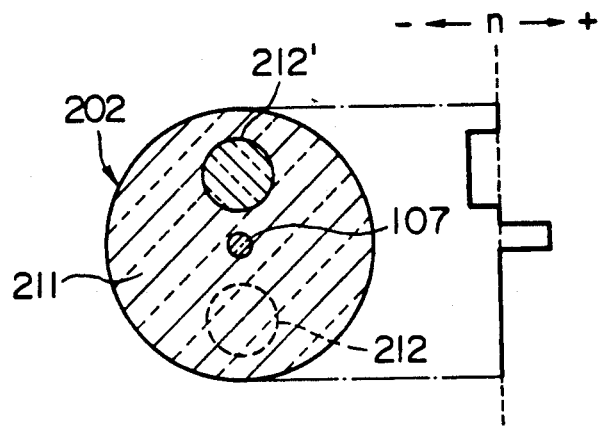
FIG. 15 is a cross-sectional view of an optical fiber used in another embodiment of the process of manufacturing an optical fiber coupler of this invention.

In order to further increase the accuracy, an optical fiber 102' having a construction as shown in FIG. 13 can be used advantageously. The optical fiber 102' is substantially the same as the optical fiber 102 shown in FIG. 10 except that the stress-applying parts 112' of the optical fiber 102' is composed of a central part 112c having a refractive index lower than that of the cladding 111 and a refractive index controlling part 112d surrounding the central part 112c and having a refractive index higher than that of the cladding 111. The core 107 is made of $GeO_2$-doped $SiO_2$ and the cladding is made of $SiO_2$. $B_2O_3$-doped $SiO_2$ is used as a material for the central part 112c of the stress-applying part 112 and $B_2O_3$- and $GeO_2$-doped $SiO_2$ is used for the refractive index-controlling part 112d. The refractive index $n_a$ of the index controlling part 112d is equal to the refractive index $n_{cl}$ of the cladding 111. On the other hand, the refractive index $n_c$ of the central part of the stress-applying part 112c is lower than the refractive index $n_{cl}$ of the cladding 111. When the optical fiber 102' is ivewed from the side only the central part 112c of the stress-applying part 112, which central part has a refractive index lower than that of the cladding 111, is seen darker. The optical fiber 102' can be produced in the same manner as the optical fiber 102 used in the fabrication of the optical fiber coupler 101 shown in FIGS. 10 to 12. That is, one of the stress-applying parts 112' is fixed to the glass block 103 by inserting it in the groove 105 with one of the stress-applying part 112' facing the open side end of the grooved glass block 103 and another facing the bottom of the groove 105 and pouring an adhesive 113 in the groove followed by curing, and subsequently the thus-obtained substrate 103 is polished to remove one of the stress-applying parts 112' to form a polished part 106, thus giving rise to a polished optical fiber 102''. In this case, when the optical fiber 102' is viewed from the side only the central part 112c of the stress-applying parts 112 is seen darker, which is advantageous in that upon the adjustment or alignment of the optical fiber 102' in the axial direction by monitoring the relative position of the two stress-applying parts 112 therein monitoring the central parts 112c having a small diameter permits a very precise adjustment in the axial direction. In the same manner as in the case shown in FIGS. 10 to 12, an optical fiber coupler 101' can be obtained using the above-described polished optical fiber 102'' (FIG. 14).

FIGS. 15 to 18 show another example of the process for manufacturing optional fiber couplers according to this invention. Suitable example of the optical fiber used in this example is an optical fiber 202 having a construction shown in FIG. 15. The optical fiber 202 comprises a core 207 positioned in the center of the fiber, a cladding 211 surrounding the core 207 and a pair of stress-applying parts, i.e., a first stress-applying part 212 and a second stress-applying part 212' arranged in the cladding 211 so as to sandwich thecore 207. As for the composition of the materials constituting the members, the core 207 is made of $GeO_2$-doped $SiO_2$ and the cladding is made of $SiO_2$. The first stress-applying part 212 is made of $GeO_2$- and $B_2O_3$-doped $SiO_2$, and $B_2O_3$-doped $SiO_2$ is used as a material for the second stress-applying part 212'. The refractive index $n_1$ of the first stress-applying part 212 is equal to the refractive index $n_{cl}$ of the cladding 111. On the other hand, the refractive index $n_2$ of the second stress-applying part 212' is lower than the refractive index $n_{cl}$ of the cladding 111.

Figure 16:
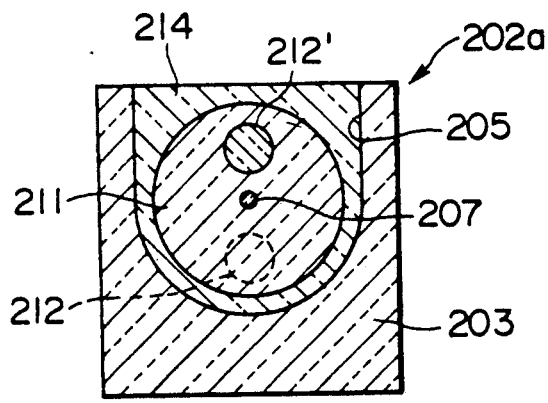
FIG. 16 is a cross-sectional view of the grooved substrate in which the optical fiber shown in FIG. 15 is embedded.

The optical fiber 202 is inserted in a grooved substrate 203 made of quartz, more particularly in a groove 205, and then the direction of the optical fiber 202 is adjusted to be in such a state that the first stress-applying part 212 faces the bottom of the groove 205 and the second stress-applying part 212' tends toward the open side end of the substrate 203 (FIG. 16). Then, an adhesive 213 is poured in the groove 205 and cured. Upon the adjustment of the direction of the optical fiber 202, it is desirable to pass visible light through the grooved substrate 203 on the side thereof and monitor with eye using a microscope or otherwise the position of the optical fiber 202 in the groove 205. When the optical fiber 202 is viewed from the side of the grooved substrate 203 only the central part 112c of the stress-applying part 112, which central part has a refractive index lower than that of the cladding 111, is seen darker. The optical fiber 102' can be produced in the same manner as the optical fiber 102 used in the fabrication of the optical fiber coupler 101 shown in FIGS. 10 to 12. That is, one of the stress-applying parts 112' is fixed to the glass block 103 by inserting it in the groove 105 with one of the stress-applying part 112' facing the open side of the grooved glass block 103 and another facing the bottom of the groove 105 and poruing an adhesive 113 in the groove followed by curing, and subsequently the thus-obtained substrate 103 is polished to remove one of the stress-applying parts 112' to form a polished part 106, thus giving rise to a polished optical fiber 102''. In this case, when the optical fiber 102' is viewed from the side only the core 207 having a refractive index higher the refractive index of the cladding 211 seen brighter, and the second stress-applying part 212' having a refractive index lower than that of the cladding 211 is seen darker. The direction of the optical fiber 202 is adjusted so that the second stress-applying part 212' can be directed toward the upper side or open side of the groove 205 while rotating the optical fiber 202. The adhesive 213 poured in the groove 205 is preferably a transparent one so as to permit monitoring with eye from the side of the substrate 203. In the above-described operation a substrate 203a having embedded in the groove 205 therein the optical fiber 202 (FIG. 16).

Figure 17:
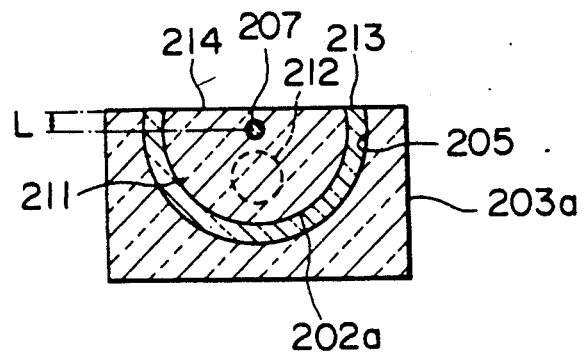
FIG. 17 is a cross-sectional view of a polished substrate obtained by polishing the grooved substrate shown in FIG. 16.

Then, the substrate 203a is polished in the direction from above the groove 205 toward the bottom of the groove 205 to remove the second stress-applying part 212' and expose a part near the core 207, thus forming a polished surface 214. The thus-processed substrate is named polished substrate 203a (FIG. 17). By this processing, the optical fiber 202 is converted to a polished optical fiber 202a in which light power propagating in the core 207 leaks to some extent from the polished surface 214 to the outside. The amount of light power leaking in the polished optical fiber 202a depends on the distance L between the polished surface 214 and the core 207. The larger the distance L the smaller the amount of leakage of light power and on the contrary the smaller the distance L the larger the amount of leakage of light power. Therefore, polishing is performed precisely so that an optimal distance L predetermined depending on the desired output bifurcation. ratio can be obtained. The polished surface 214 must be as smooth as possible in order to minimize the loss of light power due to scattering which occur when the incident light which leaks from one core 207a enters another core 207b to form coupled light after connecting the polished surfaces 203.

Figure 18:
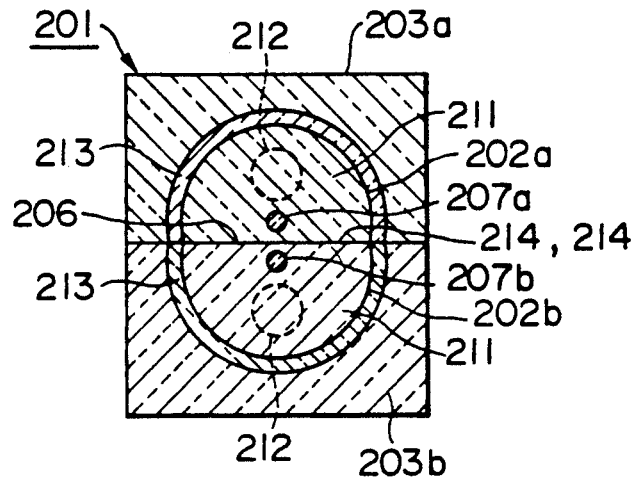
FIG. 18 is a cross-sectional view of an optical fiber coupler obtained by connecting a pair of the polished substrates shown in FIG. 17.

Subsequently, the two polished substrates 203a and 203b prepared as described above are connected with bringing the polished surfaces 214 and 214 in contact with each other (FIG. 18). Upon connection, there is mounted on the polished surface 214 of one polished substrate 203a another polished substrate 203b and the polished substrates 203a and 203b are slided relatively to each other so that the cores 207a and 207b can be opposite to each other with the polished surfaces 214 intervening therebetween while monitoring using a microscope, etc., the positions of the cores 207a and 207b from around the polished substrates 203a and 203b, thus achieving fine position adjustment. Thereafter, the polished substrates 203a and 203b are fixed to each other with an adhesive and the like. Any conventional adhesive may be used for this purpose. At the time of the position adjustment, the cores 207a and 207b in the optical fibers 202a and 202b, which have a refractive index higher than that of the remaining portion of the fiber looks bright when monitored from the side of the polished substrates 203a and 203b. With this construction, it is easy to monitor the positions of the cores 207a and 207b because the refractive index $n_1$ of the first stress-applying parts 212a and 212b is equal to the refractive index $n_{cl}$ of the cladding 211 and they are not discernible from the cladding when monitoring the cores 207a and 207b with eye. Upon connecting the polished substrates, it is desirable to use an index matching oil, which is provided between the polished surfaces 214a and 214b in order to reduce the coupling loss between the polished surfaces 214a and 214b.

In the same manner as in the optical fiber coupler 101 as described abobe, the optical fiber coupler 201 thus formed is constructed so as to perform coupling of light power at the contact part 206 where the polished surfaces 214a and 214b of the polished optical fibers 202a and 202b, respectively. More particularly, the incident light propagating in the polished optical fiber 202a is partly bifurcated at the contact part 206 and divided light powers are obtained from output side port of the optical fiber 202a (straight path) and from branch output side port of the polished optical fiber 202b (crossing path) at a predetermined output bifurcation ratio.

In this example of the process for manufacturing optical fiber couplers, various effects in addition to those described for the previous examples are obtained. For example, use of the first stress-applying part 212 having a refractive index $n_1$ equal to the refractive index $n_{cl}$ of the cladding 211 and the second stress-applying part 212' having a refractive index $n_2$ lower than the refractive index $n_{cl}$ of the cladding 211 enables, upon embedding the optical fiber 202 in the groove 205 in the grooved substrate 203, controlling the position the optical fiber 202 by observing with eye the second stress-applying part 212' which looks darker because $n_2$ is smaller than $n_{cl}$, and upon connecting the polished substrates 203a and 203b, controlling the position of the polished substrates 203a and 203b by observing with eye the cores 207a and 207a since $n_1$ is equal to $n_{cl}$. From this it follows that monitoring of output light can be eliminated upon embedding the optical fiber 202 and upon connecting the polished substrate 203a and 203b. Since the positions of the polished substrates 203a and 203b can be adjusted finely by monitoring the cores 207a and 207b upon connecting two polished substrates 203a and 203b fine adjustment can be performed precisely and speedily, resulting in improvement in the reliability of the resulting optical fiber couplers and simplification of production line thereof.

Figure 19:
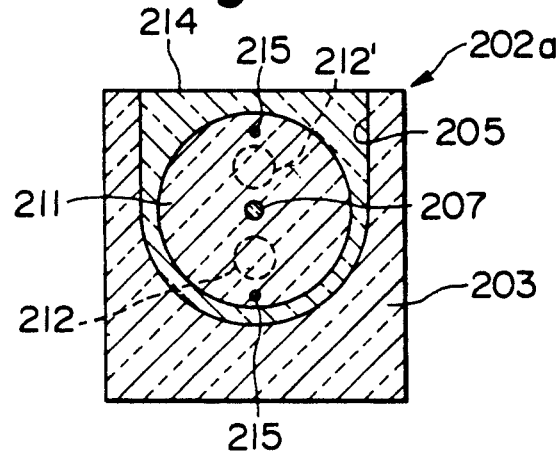
FIG. 19 is a cross-sectional view of a grooved substrate in which an optical fiber comprising a marker part is embedded.

FIG. 19 shows another example of the process for manufacturing optical fiber couplers according to this invention. In this example, all the stress-applying parts 212 have the same refractive index which is equal to the refractive index $n_{cl}$ of the cladding 211. In this case, however, at least one marker part 215 is provided in the cladding 211 which has a refractive index $n_m$ different from the refractive index $n_{cl}$ of the cladding 211. When the refractive index $n_m$ is larger than $n_{cl}$ the marker part 215 looks brighter in the fiber. On the contrary, it looks darker when $n_m$ is smaller than $n_{cl}$. It is preferred that the diameter of the marker part 215 be as small as possible within the range where observation is possible in order to precisely align the polarization axis with the direction of polishing.

In the cases of FIGS. 10 to 12, FIGS. 13 and 14, and FIGS. 15 to 18, the stress-applying parts 112 or 212 or the central parts 112a are made of a material having a refractive index lower than that of the cladding 111 or 211. However, in this invention, the stress-applying parts and the central parts may be made of a material whose refractive index is higher than that of the cladding, for example, a material composed of $B_2O_3$-doped $SiO_2$ as a basic component and a suitable amount of $GeO_2$ or $P_2O_5$ as additional dopant. In this case, the stress-applying parts and the central parts look brighter is the optical fiber.

Hereinafter, preferred embodiments of this invention will be described.

Figure 20:
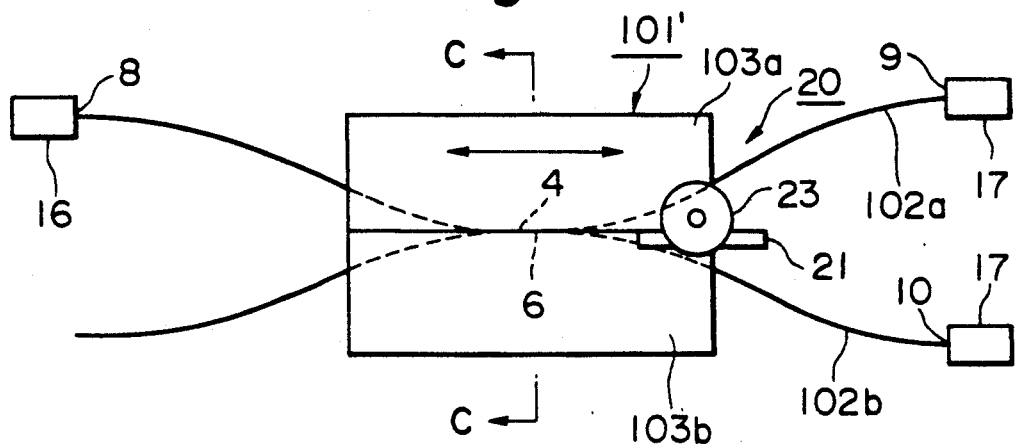
FIG. 20 is a schematical cross-sectional view illustrating an optical fiber coupler provided with a sliding device.
Figure 21:
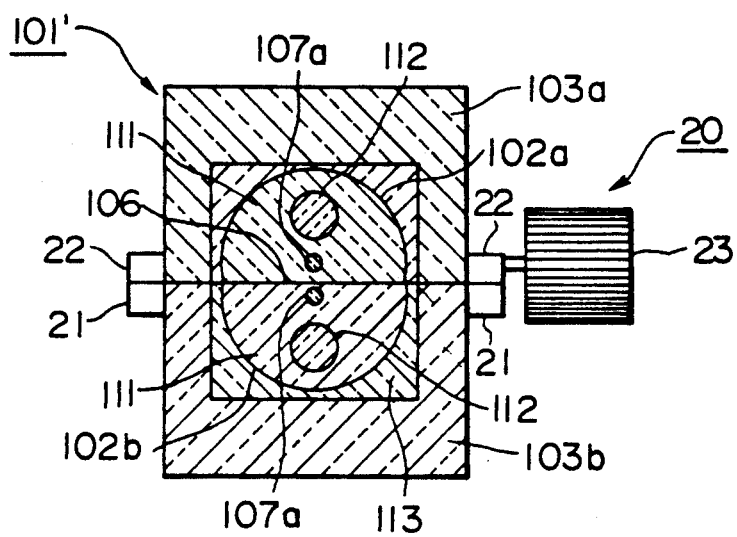
FIG. 21 is an enlarged cross-sectional view taken along the line C—C in FIG. 20.

FIGS. 20 and 21 show one preferred embodiment of this invention in which a slide device 20 is used. The optical fiber shown in FIG. 21 has substantially the same construction as the optical fiber shown in FIG. 10; the same members are designated by the same reference numerals and detailed description therefor are omitted here. The optical fiber 101' is different from the optical fiber 101 shown in FIG. 10 in that one polished optical fiber 102a is fixed to the glass block 103a which is operatively connected to the slide device 20 and movable, and another optical fiber 102b is fixed to the glass block 103b which is operatively connected to the sliding device 20 and is stationary, with the polished parts 104a and 104b of the polished optical fibers 102a and 102b, respectively, being in slidable contact with each other. The sliding device 20 comprises a rail 21 fixed to the fixed side (stationary) glass block 103b, a slider 22 slidably mounted on the rail 21 and fixed to t he movable side glass block 103a and a adjusting screw 23 for adjusting the slidable movement or the relative position of the movable glass block 103a. By rotating the head of the adjusting screw 23 a gear (not shown) meshed with a rack (not shown) in the rail 21 rotates to slide the movable glass block 103a in the longitudinal direction. The movable glass block 103a and the stationary glass block 103b can be produced in the same manner as in the glass blocks 103a and 103b as described hereinabove. That is, in the groove 105 formed in the glass block for preparing movable or stationary glass block there is inserted the optical fiber 102 and the adhesive 113 is poured in the groove 105 to fix the optical fiber 102 followed by polishing the surface on which the groove 105 is formed to obtain the movable glass block 103 with the polished surface exposed. The optical fiber 102 is polished to such an extent that a part near the core 7 is exposed so that a relatively large amount of leakage of light power is obtained (i.e., the distance L between the polished surface and the core is small (FIG. 17)). Then, the movable glass block 103a is mounted on the thus-formed stationary glass block 103b. The polished surfaces 104a and 104b of the glass blocks 103a and 103b, respectively, are brought in contact witheach other, and a slider 22 is attached to the rail 21 fixed to the stationary glass block 103b.

The optical fiber coupler 101' thus produced is used as follows. At first, light power is transmitted from a light source 16 to one polished optical fiber 102a. Coupling of light power is performed at a contact part 106. Light powers are emitted from the output side port 9 of the polished optical fiber 102a and from the branch output side port of the other polished optical fiber 102b, and are detected by respective light detectors 17 connected to the ports 9 and 10, respectively. Then, by rotating the adjusting screw 23 attached to the slider the movable glass block 103a is slided till a position is reached where light powers emitted from the output side port 9 and branch output side port 10 are at a predetermined bifurcation ratio.

With the optical fiber coupler 101', any desired output bifurcation ratio can be obtained by bringing the polished optical fibers 102a and 102b with a relatively large amount of polishing in contact with each other and sliding the movable glass block 103a to which the polished optical fiber 102a is fixed on the stationary glass block 103b to which the polished optical fiber 102b is fixed in the direction of the axes of the polished optical fibers 102a and 102b.

Figure 2:
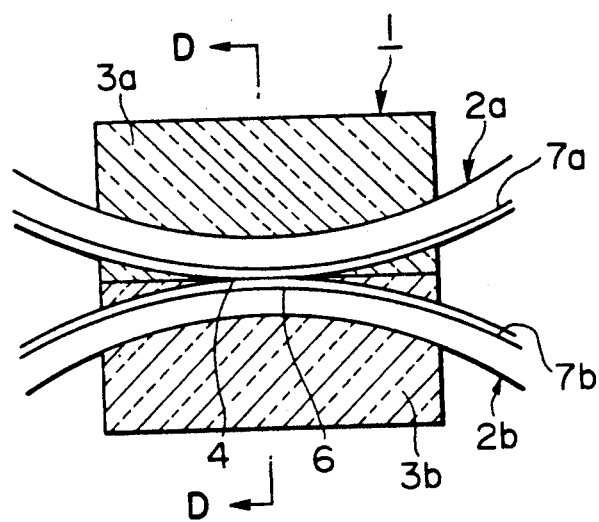
FIG. 2 is a cross-sectional side elevation of an important part of the optical fiber coupler shown in FIG. 1.
Figure 3A:
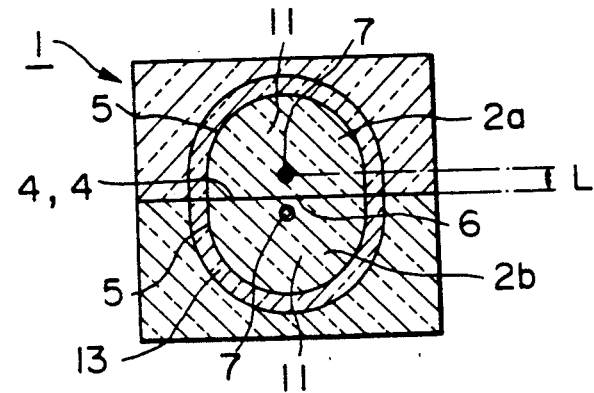
FIG. 3a is an enlarged cross-sectional view along the line D—D of the optical fiber coupler shown in FIG. 2 when the optical fiber used is a non-stress-applying polarization-maintaining optical fiber.
Figure 22:
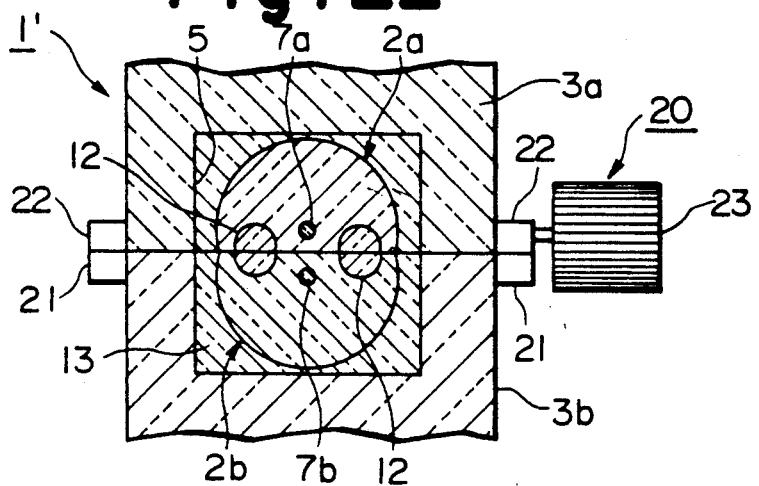
FIG. 22 is a cross-sectional view illustrating an optical fiber coupler with a sliding device in which an optical fiber having a polarization principal axis in the direction different from that of the optical fiber shown in FIGS. 21.

Hereinabove, description has been made on the case where the polarization principal axis X coincides with the direction of the depth of the groove in the substrate. However, this embodiment can also be applied to the case where the polarization principal axis Y coincides with the direction of the depth of the groove in the substrate as shown in FIG. 22. In this case, the difference between the optical fiber coupler 1' and the optical fiber coupler 101' shown in FIGS. 20 and 21 is which of the axis X or Y coincides with the direction of the depth of the groove. The difference between the optical fiber coupler 1' and the optical fiber coupler 1 shown in FIGS. 1 to 3 is in that in the coupler 1' one polished optical fiber 2a is fixed to the movable glass block 3a operatively connected to a slide device 20' similar to the slide device 20 shown in FIG. 21 and another polished optical fiber 2b is fixed to the stationary glass block 3b operatively connected to the slide device 20', with the polished parts 4a and 4b of the polished optical fibers 2a and 2b, respectively, being brought in slidable contact with each other. The slide device 20' comprises a rail 21 fixed to the stationary glass block 3b and a slider 22 fixed to the movable glass block 3a and an adjusting screw 23 attached to the slider 22. By rotating the adjusting screw 23 a gear 9not shown) connected to the screw 23 and meshed with a rack (not shown) provided in the rail 21 is rotated to let the movable glass block 3a slide in the longitudinal direction. As for other points, the same description as above are valid and detailed description is omitted here.

The optical fiber coupler 1' or 101' thus produced are used in the following manner. That is, firstly, light power from a light source 16 is introduced in one of the polished optical fibers 2 or 102. Junction or coupling of light power is performed at the contact part 6 or 106 and light power is emitted from the output side port 9 of the polished optical fiber 2a or 102a and from the branch output side port 10 of the polished optical fiber 2b or 102b and detected by light detectors 17 connected to the output side port 9 and branch output side port 10, respectively. By rotating the adjusting screw 23 the movable glass block 3a or 103a can be slided to a position where light powers emitted from the ports 9 and 10, respectively, are at a predetermined output bifurcation ratio.

With the optical fiber coupled 1' or 101', any desired output bifurcation ratio can be obtained by bringing the polished optical fibers 2a and 2b (or 102a and 102b) in contact with each other and sliding the movable glass block 3a (103a) and stationary glass block 3b (103b) to which the polished optical fibers 2a and 2b (102a and 102b) are fixed relatively to each other in the direction of the axes of the polished optical fibers 2a and 2b (102a and 102b). Further explanation is made with reference to FIG. 23 (in the case of the optical fiber coupler 1' the same explanation is essentially valid and detailed description thereon is omitted).

In the optical fiber coupler 101' shown in FIG. 20, light amplitudes A and B in the polished optical fiber 102b (2b) when light power is introduced from the polished optical fiber 102a (2a) are given by thefollowing formulae $$A = \left[ \cos(\Delta \cdot z) + j\frac{Bb - Ba}{2\Delta} \sin(\Delta \cdot z) \right] \cdot \quad (1)$$

$$\exp\left[ -j\frac{Ba + Bb}{2\Delta} \right]$$

$$B = \left[ -\frac{k}{\Delta} \sin(\Delta \cdot z) \right] \cdot \exp\left[ -j\frac{Ba + Bb}{2} z' \right] \quad (2)$$

$$\Delta = \left[ \left(\frac{Ba - Bb}{2}\right)^2 + K^2 \right] \quad (3)$$

wherein Ba and Bb represent propagation constants of the polished optical fibers 102a (2a) and 102b (2b), respectively;

z represents coupling length in the direction of the fiber axis;

k represents mutual coupling constant between the polished optical fibers 102a (2a) and 102b (2b).

The propagation constants Ba and Bb of the polished optical fibers 102a (2a) and 102b (2b), respectively, are considered to be the same for optical fiber couplers using similar optical fibers. Hence, formulae (1), (2) and (3) are rewritten as follows.

$$A = \cos(kz)\exp(-jBz) \quad (4)$$

$$B = -\frac{k'}{k} \sin(kz)\exp(-jBz) \quad (5)$$

$$\Delta = k \quad (6)$$

Figure 23:
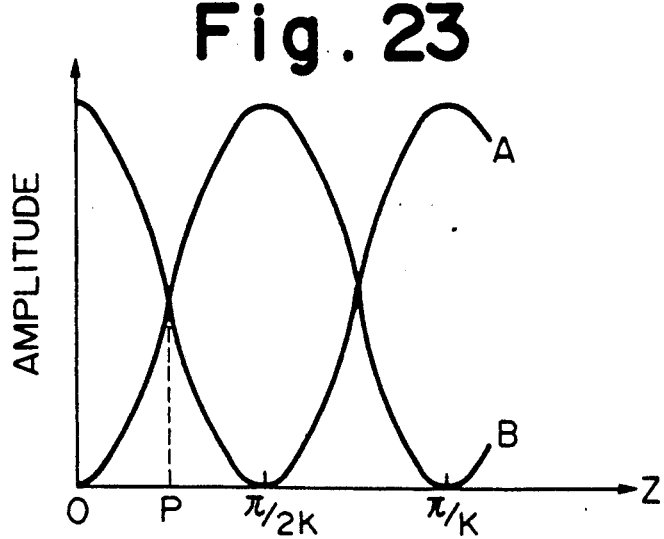
FIG. 23 is a graph illustrating the change in output bifurcation ratio of the optical fiber coupler shown in FIG. 21.
Figure 24:
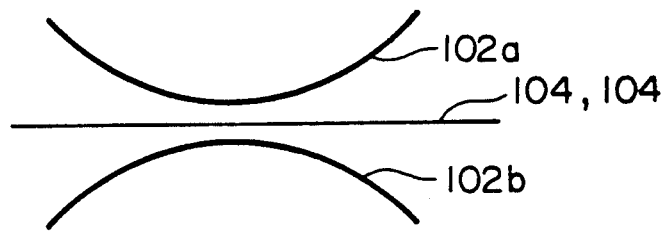
FIGS. 24 to 26 are enlarged views of important part of the optical fiber coupler shown in FIG. 21 illustrating the sliding action of the polished optical fiber.
Figure 25:
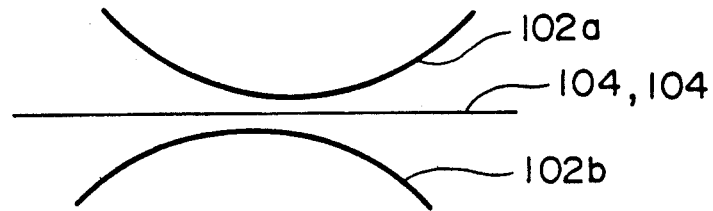
Figure 26:
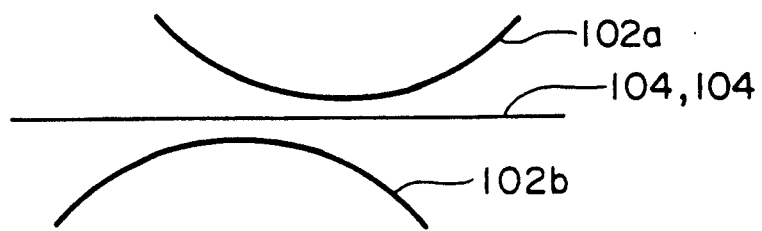

FIG. 23 shows the above relationship. From FIG. 23, it can be seen that when the coupling length in the direction of the fiber axis z is $\pi/2k$ light power is converted completely. With the optical fiber coupler having a output bifurcation ratio of 1:1, the coupling length in the direction of the fiber axis is selected to be one indicated by point P in FIG. 23. As stated above, by changing the coupling distance and the coupling length in the direction of the fiber axis the output bifurcation ratio of optical fiber couplers can be set up at any desired value. For example, as shown in FIGS. 24 and 25, the output bifurcation ratio can be changed by translating the polished optical fibers 102a and 102b in the direction of the fiber axis. That is, the coupling constant is maximum in the case shown in FIG. 24. FIG. 25 shows the case where the polished optical fiber 102b is translated and the coupling constant is smaller than in the case shown in FIG. 24. FIG. 26 shows the case where the polished optical fiber is further translated, i.e., the distance between the polished optical fibers 102a and 102b is large and the coupling constant is minimum.

From the above, it follows that with the optical fiber coupler 101', output bifurcation ratio can be changed freely by translating the polished optical fibers 102a and 102b and thus it is unnecessary to provide various glass blocks with various amount of polishing in order to obtain different output bifurcation ratios, resulting in the simplification of complicated production process and reduction in the occurrence of unacceptable products, for example, due to excessive polishing of optical fibers.

Figure 3B:
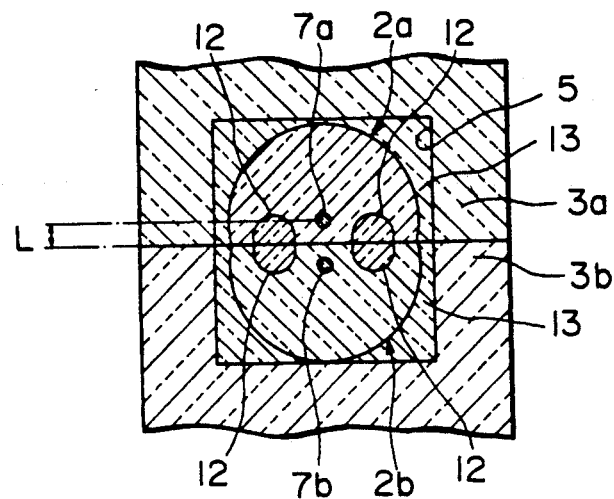
FIG. 3b is an enlarged cross-sectional view along the line D—D of the optical fiber coupler shown in FIG. 2 when the optical fiber used is a stress-applying polarization-maintaining optical fiber.

Although the above described process is an example for fabricating the optical fiber couplers shown in FIG. 3b and FIG. 10 it is obvious that it can be applied to the optical fiber couplers shown in FIGS. 14, 18 and 19.

Figure 27:
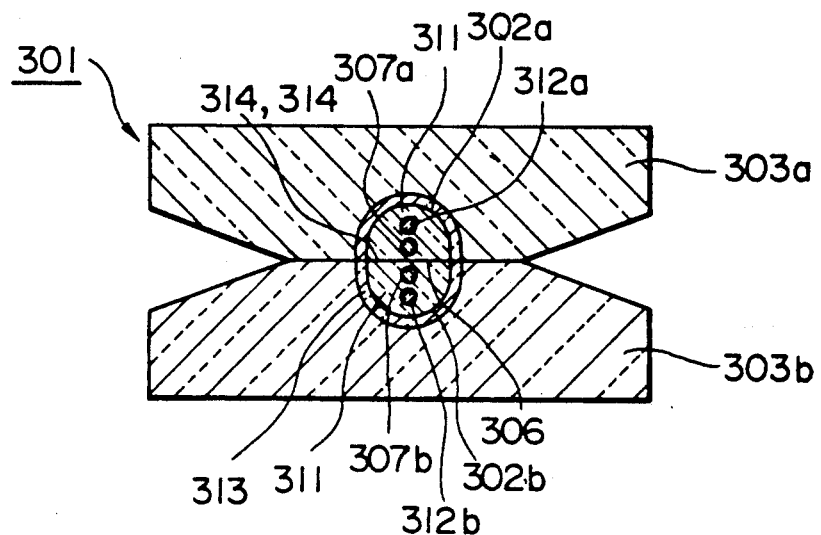
FIG. 27 is a cross-sectional side elevation of an optical fiber coupler of which the polished surface of the polished substrate has an area smaller than that of the opposite surface (back surface)

FIG. 27 shows another preferred embodiment of this invention, in which reference numeral 301 designates an optical fiber coupler. The fundamental structure of the optical fiber coupler may be the same as those described hereinabove except for the shape of the substrates. The optical fiber coupler 301 comprises two polished substrates 303a and 303b. Each of the substrates 303a and 303b comprises a grooved substrate which has a polished surface 314 on the open side end thereof. The grooved substrate 303a or 303b is adapted to hold therein a polished optical fiber 302a comprising a core 307, a cladding 311 and a stress-applying part 312 with a part of the cladding 311 being polished off or lapped to expose a part near the core 307. The polished surface 314 of the optical fiber 302 is close to the core 307 so as to allow leakage of light power propagating in the core 307 to the outside. The polished optical fibers, i.e., polished optical fibers 302a and 302b are embedded in grooved substrates 303a and 303b, respectively, more particularly in grooves 305 therein and fixed thereto with an adhesive 313 in such a manner that the polished surface 314 of the grooved substrate is in flush with the polished surface of the polished optical fiber. The two polished substrates are in close contact with each other on the polished surfaces thereof to form a contact part 306 and this construction enables coupling of light power.

Figure 28:
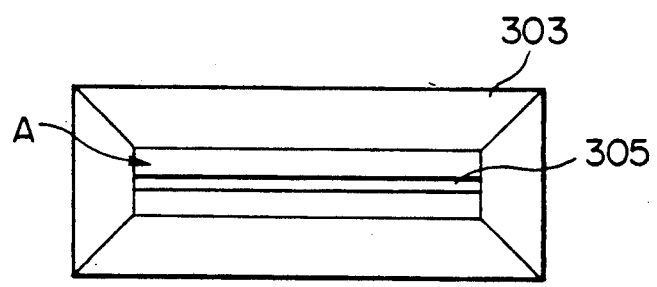
FIG. 28 is a plan view of the grooved substrate used in the optical fiber coupler shown in FIG. 27.
Figure 29:
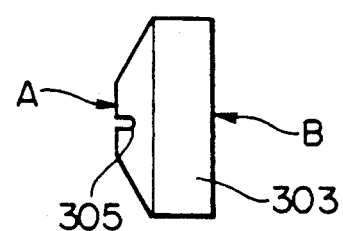
FIG. 29 is a front view of the groove substrate used in the optical fiber coupler shown in FIG. 27.
Figure 30:
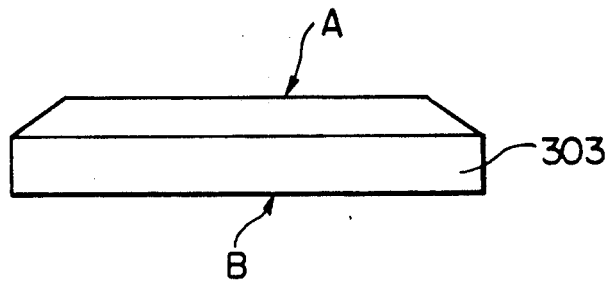
FIG. 30 is a side elevation of the grooved substrate used in the optical fiber coupler shown in FIG. 27.

The grooved substrate 303 have a construction as shown in FIGS. 28 to 30. That is, the surface A where the groove 305 for holding the optical fiber 302 is provided has a smaller area than the opposite surface B since the periphery of the surface A is polished off to reduce the area of the surface A. The grooved substrate 303 is made of a transparent hard material composed of quartz glass, multi-component glass, fluoride glass, etc. It is preferred to use the same material as that of the polished optical fibers 302a and 302b.

The fiber coupler 301 is capable of bifurcating light power or coupling light powers at the contact part 306 where the cores 307a and 307b of the polished optical fibers 302a and 302b, respectively, are arranged close to each other. For example, when light power is introduced in the core 307a of the polished optical fiber 302a on the incident side it is partly leaks at the contact part 306 to the side of the other polished optical fiber and enters the core 307b in the other polished optical fiber 302b. As the result, light powers are obtained from the output side port of the polished optical fiber 302a and from the branch output side port of the polished optical fiber 302b at a predetermined output bifurcation ratio.

The optical fiber coupler 301 can be fabricated as follows. At first, a substrate 303 made of a transparent material composed of quartz glass, for example, is ground suitably and the periphery of surface A where the groove 305 is to be formed is polished off, and the groove 305 is formed along the length of the substrate. By the grinding operation the grooved substrate 303 shown in FIGS. 28 to 30 is prepared. Then, the optical fiber 302 is embedded in the groove 305 and the adhesive 311 is poured in the groove 305 and cured. The surface A and surface B opposite thereto are held by a holding jig in the polishing apparatus, and polishing is performed till the predetermined amount of polishing is achieved. By this polishing operation, the optical fiber fixed to the groove 305 is polished such that a part of the cladding is removed to near the core 307 to give polished optical fiber 302'. Thus, the grooved substrate 303 is converted to the polished substrate 303' holding the polished optical fiber 302a' or 302b' with the polished surface 314 thereof being exposed on the surface A. Two of the thus-formed polished substrates 303a' and 303b' are superimposed one over another such that the polished surfaces 314a and 314b are in contact with each other using the matching oil 315 between the surfaces A followed by connection with the adhesive 313 or otherwise to prepare the optical fiber coupler 301.

Since the optical fiber coupler 301 comprises the polished substrate 303' whose surface A has an area smaller than that of the opposite surface B the area of contact between the polished substrates 303a' and 303b' can be small even when the area of the surface B to be fixed to the holding jig is made large. This is advantageous in that even when the flatness of the surface A is insufficient variation in coupling characteristics occuring due to localization of the matching oil 315 intervening between the surfaces A of the polished optical fibers upon temperature change, etc. can be reduced. Therefore, the environment resistance of the optical fiber coupler 301 is improved. Further, reduction in the area of the surface A leads to reduction in the occurrence of insufficiency of polishing, thus enabling simplification of the fabrication of optical fiber couplers.

Figure 31:
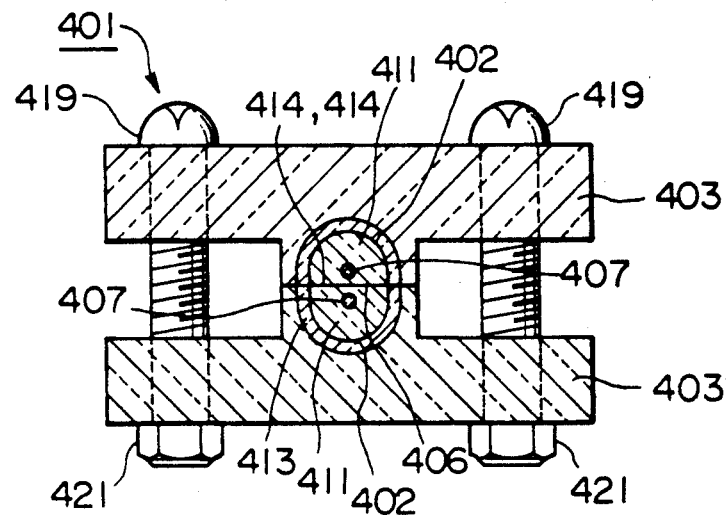
FIG. 31 is a cross-sectional side elevation of an optical fiber coupler in accordance with another embodiment of this invention of which the polished surface of the polished substrate has an area smaller than that of the opposite surface.
Figure 32:
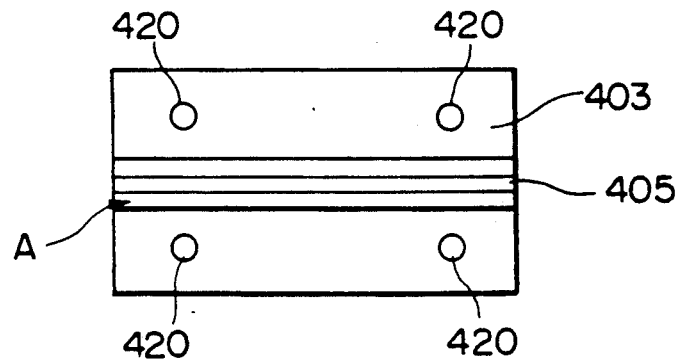
FIG. 32 is a plan view of the grooved substrate used in the optical fiber coupler shown in FIG. 31.
Figure 33:
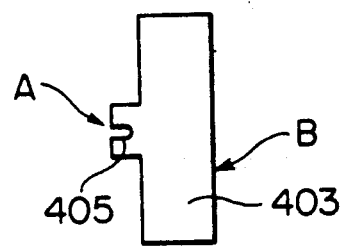
FIG. 33 is a front view of the grooved substrate used in the optical fiber coupler shown in FIG. 31.
Figure 34:
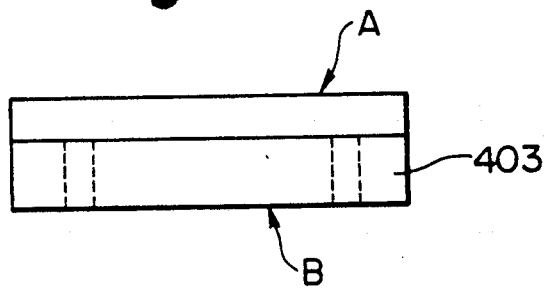
FIG. 34 is a side elevation of the grooved substrate used in the optical fiber coupler shown in FIG. 31.

FIG. 31 shows yet another embodiment of this invention. In this embodiment an optical fiber coupler 401 comprises a grooved substrate 403 which is substantially T-shaped in a cross-section in a plane perpendicular to the longitudinal axis and which has a groove 405 formed in a protruding portion or foot of "T" shape as shown in FIGS. 32 to 34. The grooved substrate 403 may be made of a transparent hard material composed of quartz glass, multi-component glass, fluoride glass, etc. in the same manner as in the preceding embodiments. Around the corners of the grooved substrate 403 are formed through holes 420 for inserting bolts 419.

The optical fiber coupler 401 is produced as follows. That is, an optical fiber 402 is embedded in the groove 405 in the grooved substrate 403 described above and an adhesive 413 is filled in the groove 405 to fix the optical fiber 402 thereto. Then, the surface B of the grooved substrate 403 is fied to the holding jig of the polishing apparatus and the surface A is polished till a predetermined amount of polishing is achieved. This operation gives rise to polished substrate 403a' and 403b' comprising the grooved substrates 403a and 403b, respectively, and the polished optical fibers 402a' and 402b', respectively, fixed thereto. The polished substrates 403a' and 403b' are superimposed one over another with bringing the polished surfaces 414 of the polished optical fibers 402a' and 402b' in contact with each other with the matching oil 415 intervening therebetween. Thereafter, the bolts 419 are inserted through screwed through holes 420 and then the bolts 419 are fixedly by nuts 421. In the above manner, the optical fiber coupler 401 is produced.

The optical fiber coupler 401 enables further improvement in the environment resistance thereof is compared with the optical fiber coupler 301 according to the preceding embodiment since the ratio of the area of the surface A to the area of the surface B which is fixed to the holding jig can be selected by far smaller.

Although the above embodiment is explained with reference to stress-applying polished optical fiber shown in FIG. 10, it is obvious that the above technology is also applicable to the optical fiber couplers shown in FIGS. 14, 18 and 19.

EXPERIMENT 1

Figure 35:
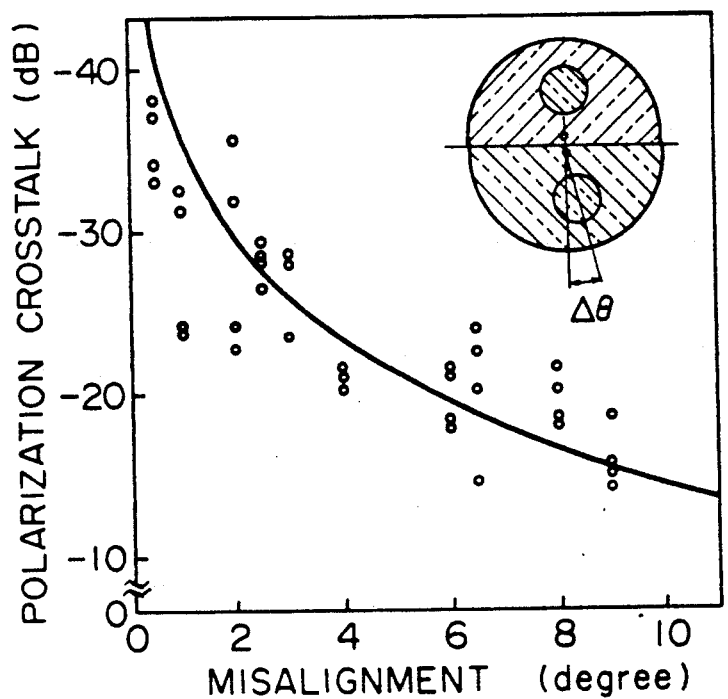
FIG. 35 is a graph illustrating the influence of the amount or degree of dislocation or misalignment between the polarization axes on the polarization-maintaining characteristics of the optical fiber coupler.

FIG. 35 shows the results of experiment on the influence of the degree of misalignment $\Delta\theta$ between polarization principal axes X of two polished optical fibers on the polarization-maintaining charcteristics of the optical fiber coupler. From the results shown in FIG. 35 it can be seen that in order to maintain the polarization-maintaining charcteristics at an unacceptable level (crosstalk of not higher than $-20$ dB) it is necessary to keep $\Delta\theta$ at a level not higher than 6 [deg].

EXPERIMENT 2

Table 1 below shows the results of comparison between the optical fiber coupler of this invention and the prior art optical fiber coupler with respect to the degree of deterioration of the polarization-maintaining characteristics.

Figure 36:
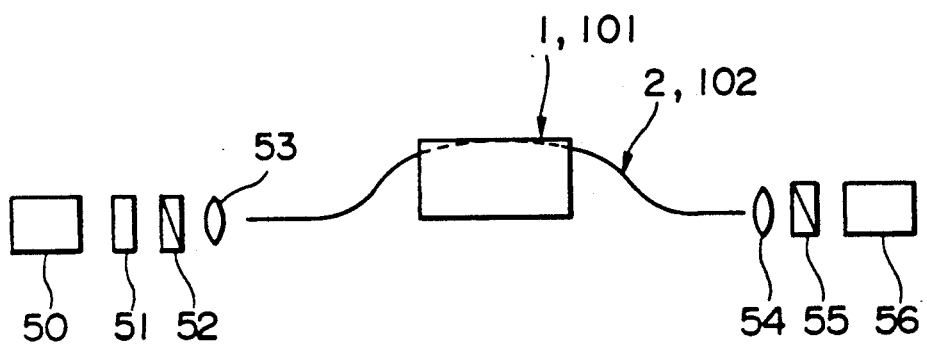
FIG. 36 is a schematical illustration of a cross-talk measuring system.

Evaluation was made by comparing crosstalks. Crosstalk values were obtained as follows. That is, as shown in FIG. 36, light from a light source 50 was passed through a quarter wavelength plate 51, a polarizer 52 and a lens 53 and was introduced in the polarization-maintaining optical fiber 2 or 102 as a linear polarized light in the direction of the principal axis; followed by detecting on the output side using a light detecting apparatus through a lens 54 and a light detector 55, thus measuring difference between photoelectric powers in the refractive axis.

The polarization-maintaining optical fiber 2 or 102 was 8 $\mu$m in core diameter, 125 $\mu$m in fiber diameter and 2 to 3 $\mu$m in distance between the core and the polished surface. The wavelength measured was 1.3 $\mu$m.

TABLE 1

|  | Invention | | Prior Art | |
|---|---|---|---|---|
| Run No. | 1 | 2 | 3 | 4 |
| Before polishing (dB) | 37 | 38 | 37 | 36 |
| After polishing (dB) | 32 | 32 | 21 | 18 |
| Deterioration (dB) | 4 | 6 | 16 | 18 |

From FIG. 1, it can be seen that the optical fiber coupler of this invention was improved by about 10 to 15 dB as compared with the prior art optical fiber coupler.

In accordance with the process of this invention an optical fiber coupler was prepared. The optical fiber and grooved substrate were as follows.

| | |
|---|---|
| Optical fiber: | 125 $\mu$m in diameter |
| Core: | GeO$_2$-doped SiO$_2$ |
| | 9 $\mu$m in diameter |
| | refractive index 1.488 |
| Cladding: | SiO$_2$ |
| | refractive index 1.458 |
| First stress-applying part: | GeO$_2$- and B$_2$O$_3$-doped SiO$_2$ |
| | 35 $\mu$m in diameter |
| Second stress-applying part: | B$_2$O$_3$-doped SiO$_2$ |
| | 35 $\mu$m in diameter |
| | refractive index 1.342 |
| Grooved substrate (quartz): | 20 mm in length |
| | 5 mm in width |
| | 2.5 mm in thickness |

This optical fiber was embedded in the groove of the grooved substrate. The adhesive of a heat-setting epoxy resin type was used. The positions of the optical fibers were adjusted by passing visible light from the side of the grooved substrate and monitoring with eye using a microscope of a magnification of 120.

The substrate after having embedded therein the optical fiber was polishing using a lap master type polishing apparatus. Polishing was performed till the distance between the polished surface and the core become 3 to 4 $\mu$m.

After polishing, two polished substrates were superimposed one over another through a UV light curable adhesive followed by fine adjustment of the positions of the polished optical fibers by monitoring the cores with eye under a microscope. Then, UV light was irradiated to cure the adhesive to fix the two polished substrates. By the above operation, a high quality optical fiber coupler with output bifurcation ratio of 50% (1:1) was obtained.

EXPERIMENT 3

Using the optical fiber coupler having the construction shown in FIG. 22, change in the output bifurcation ratio when sliding the glass blocks was measured.

| | |
|---|---|
| Fiber used: | |
| core diameter | 8 $\mu$m |
| cladding diameter | 125 $\mu$m |
| Glass block (quartz): | |
| width | 10 mm |
| length | 20 mm |
| thickness | 5 mm |

The results obtained are shown in Table 2.

TABLE 2

| Run No. | Output Bifurcation Ratio | Degree of Misalignment Between Blocks |
|---|---|---|
| 1 | 1:1 | 0 mm |
| 2 | 2:1 | 0.3 mm |
| 3 | 5:1 | 0.9 mm |

EXPERIMENT 4

(1) A quartz based multimode optical fiber of a size of 50 μm in core diameter, 125 μm in cladding diameter and 400 μm in outer diameter was fixed to a quartz grooved substrate shown in FIGS. 28 to 30. The grooved substrate was of the following size.

| Surface A: | 2 mm × 16 mm |
|---|---|
| Surface B: | 5 mm × 20 mm |
| Thickness: | 2 mm to 3 mm |
| Width of Groove | 150 μm |

The surface B of the grooved substrate to which the optical fiber was fixed was fixed to the holding jig of a polishing apparatus and the surface A was polished to expose a part near the core. The degree of polishing was such that the distance between the polished surface and the core was 2 to 3 μm. Two polished substrate thus formed were superimposed one over another and a matching oil is placed between the surfaces A followed by connecting the two polished substrates with an adhesive to prepare an optical fiber coupler having the same construction as one shown in FIG. 1 except that the optical fibers 2a and 2b were replaced by the optical fibers 102a and 102b, respectively (the resulting coupler is referred to as "Coupler A").

(2) A similar optical fiber as the above optical fiber was fixed to a grooved substrate made of quartz shown in FIGS. 32 to 34. The grooved substrate used was of the following size.

| Surface A | 1 mm × 20 mm |
|---|---|
| Surface B | 5 mm × 20 mm |
| Thickness | 3 mm to 4 mm |
| Width of Groove | 150 μm |

The grooved substrate to which the above-described optical fiber was fixed was subjected to polishing of the surface A thereof to prepared a polished substrate. The degree of polishing was such that the distance between the polished surface and the core was 2 to 3 μm as in the case of Coupler A. Two polished substrates thus-formed were superimposed one over another and a matching oil was placed between the surfaces A. Then, bolts were inserted through corresponding through holes and the bolts were fastened by nuts to connect the two polished substrates to prepare an optical fiber coupler having a construction similar to that of the conventional optical fiber coupler shown in FIG. 28 (the resulting coupler is referred to as "Coupler B").

Figure 4:
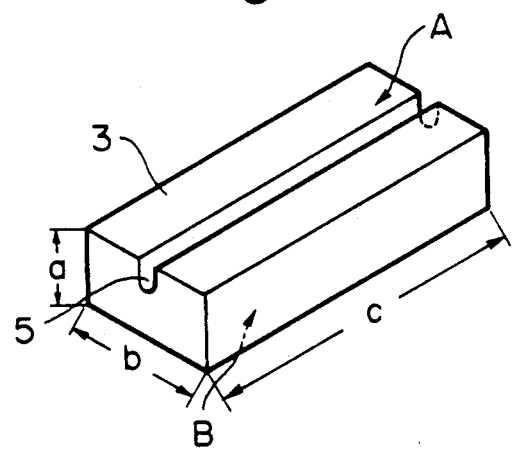
Figure 5:
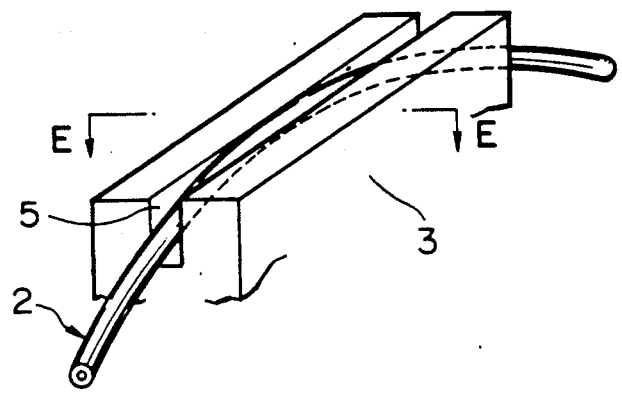
FIGS. 5 to 7 are illustrations explaining the process of manufacturing the optical fiber coupler shown in FIG. 1.
Figure 6:
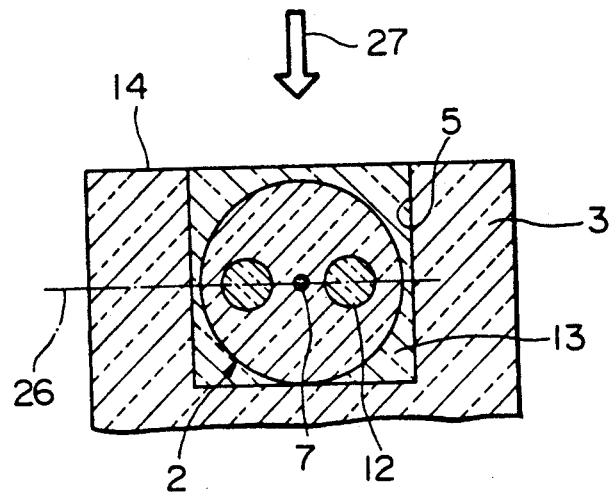
Figure 7:
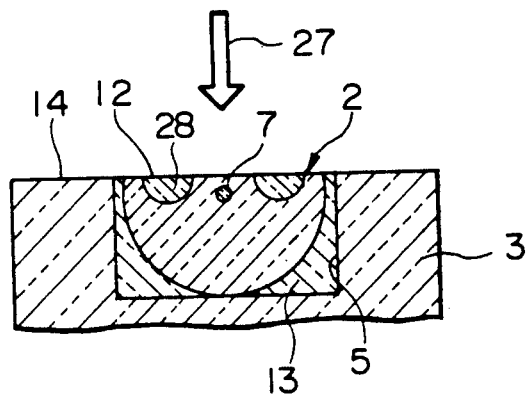
Figure 8:
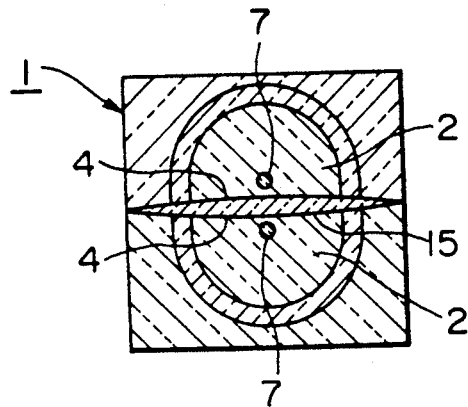
FIGS. 8 and 9 are illustrations explaining localization of an index matching oil used in the conventional optical fiber coupler.
Figure 9:
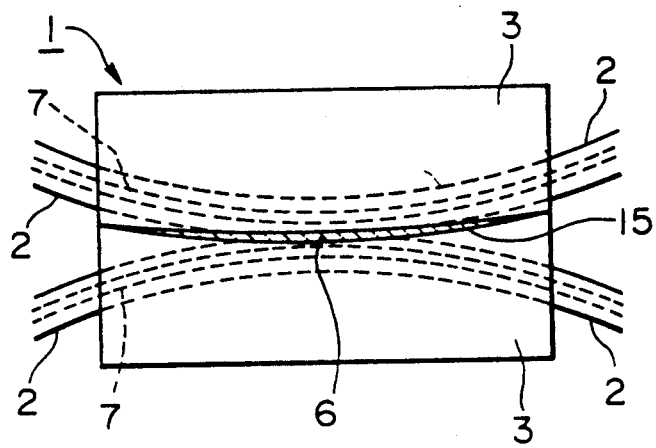

(3) In addition, an optical fiber coupler having the same construction as that of the coupler shown in FIG. 1 and compared with Couplers A and B with respect to their performance. In this optical fiber coupler, an optical fiber similar to those used in the preceding two optical fiber couplers was fixed to a grooved substrate having the construction shown in FIG. 4. The grooved substrate was of a size corresponding to the size shown in FIG. 4, that is, a=2.5 mm, b=5 mm and c=20 mm. After fixing the optical fiber in the groove in the grooved substrate, the surface A was polished to form a polished substrate. The degree of polishing was such that the distance between the polished surface and the core was 2 to 3 μm as in the two preceding optical fiber couplers. Two polished substrates thus formed were superimposed one over another and a matching oil was placed between the surfaces A and they were connected with an adhesive to form an optical fiber coupler, which is referred to as "Coupler C".

Figure 37:
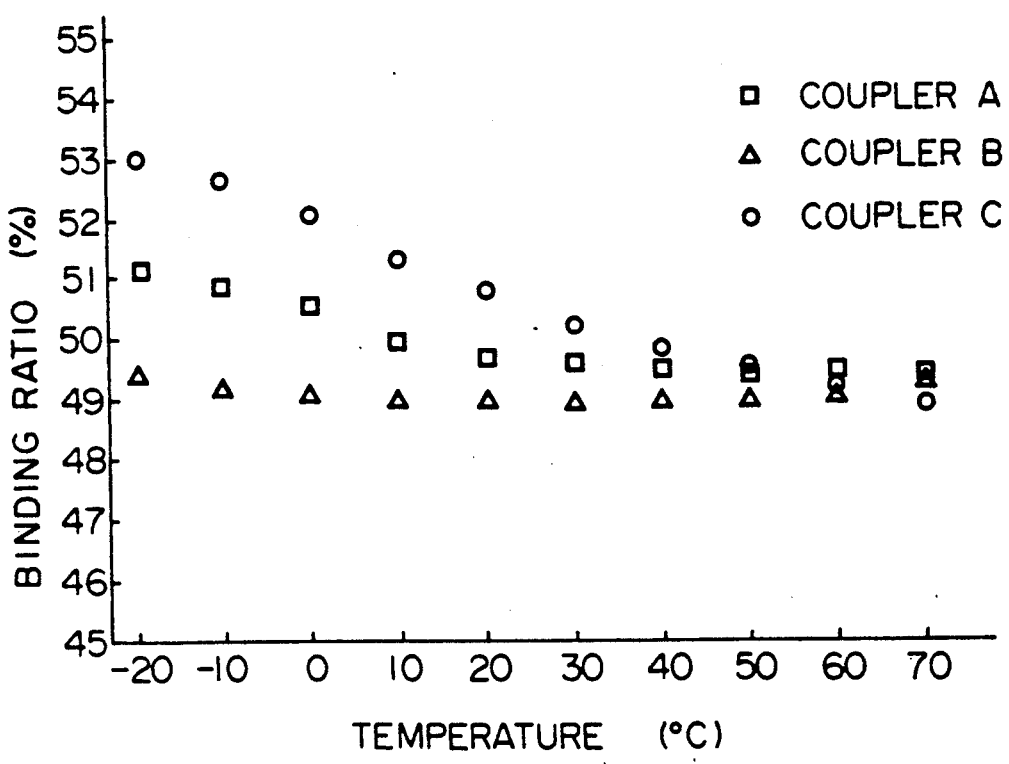
FIGS. 37 and 38 are graphs showing results of comparison between the optical fiber coupler of this invention and the conventional optical fiber coupler with respect to variation in the coupling characteristics depending on the change in temperature.
Figure 38:
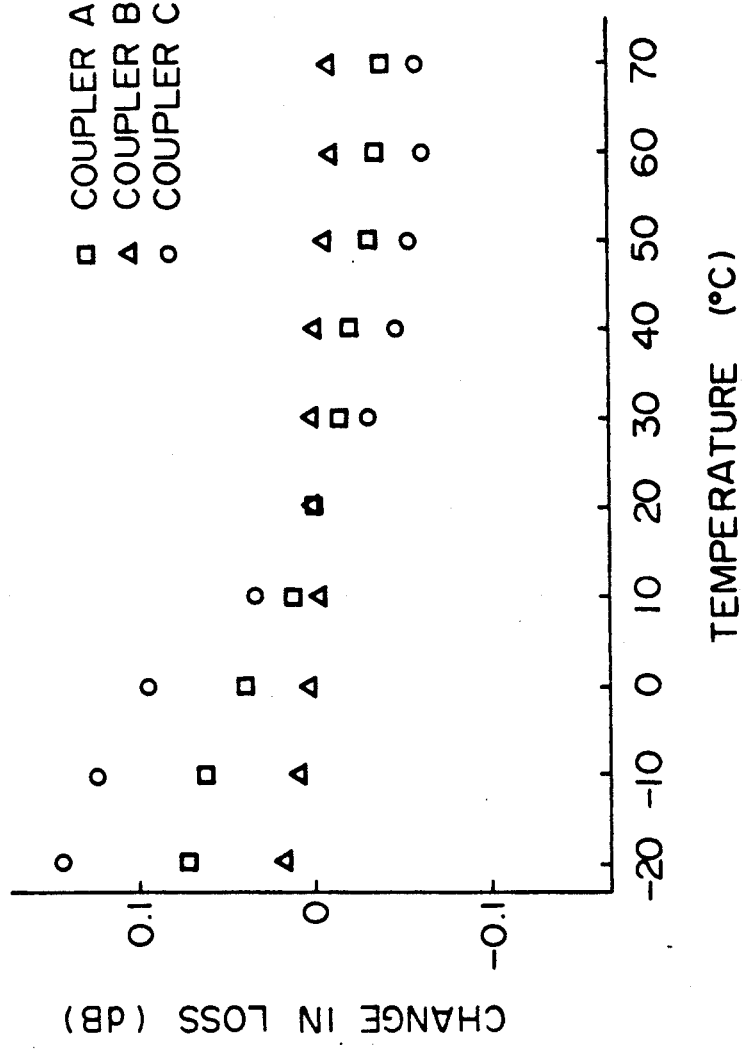

In the three couplers, degree of variation in the coupling ratio depending on the change in temperature and variation in the coupling loss due to the change in temperature were measured. FIGS. 37 and 38 are graphs showing the results of the measurements. FIG. 37 shows variation in the coupling ratio of the three couplers depending on the change in temperature, and FIG. 38 shows variation in the coupling loss of the three couplers depending on the change in temperature. In the graph illustrated in FIG. 38 the coupling loss of each coupler at 20° C. was taken as 0 (zero) and the coupling loss was plotted against the change in temperature.

As is clear from the graphs Couplers A and B of this invention show only slight variation in the coupling ratio and coupling loss due to the change in temperature as compared with Coupler C according to the prior art, and therefore the couplers of this invention are superior over the conventional optical fiber coupler with respect to environment resistance such as change in temperature.

EXPERIMENT 5

Two polarization-maintaining optical fibers were used to prepare an optical fiber coupler having a construction as shown in FIGS. 13 and 14. The following optical fiber was used.

| Fiber: | 125 μm in diameter |
|---|---|
| Core: | 8 μm in diameter |
| | $GeO_2$-doped $SiO_2$ |
| | refractive index 1.488 |
| Cladding: | $SiO_2$ |
| | refractive index 1.458 |
| Stress-applying part: | |
| Central part | 10 μm in diameter |
| | $B_2O_3$-doped $SiO_2$ |
| | refractive index 1.458 |
| Refractive index controlling part | $GeO_2$- and $B_2O_3$-doped $SiO_2$ |
| | refractive index 1.342 |

An optical fiber coupler was prepared using the optical fiber described above and crosstalk indicating polarization-maintaining characteristics was measured. As the result, the optical fiber coupler showed a crosstalk of −33 dB. On the other hand, the conventional optical fiber coupler showed a crosstalk of −15 to −30 dB. Therefore, it was confirmed that the optical fiber coupler of this invention is superior over the conventional optical fiber coupler with respect to polarization-maintaining characteristics.

What is claimed is:

1. An optical fiber coupler comprising a set of coupler halves, each coupler half comprising: a polished grooved substrate having a polished one side surface with a groove opening formed therein and adapted to embed an optical fiber therein and a side surface opposite the polished one side surface, and a polished optical fiber portion comprising a core and a cladding surrounding the core, wherein a part of the optical fiber is polished off such that a polished surface of the fiber is formed close to the core so as to allow leakage of light power propagating in the core to the outside, wherein the polished optical fiber part is embedded in the grooved substrate and fixed thereto to dispose the polished surface of the grooved substrate flush with the polished surface of the polished optical fiber part, wherein the flush polished surfaces of the two coupler halves are fixed in close contact with each other to allow coupling of light power, and wherein the width, perpendicular to the longitudinal direction of the optical fiber, of the polished one side surface of each of said coupler halves inclusive of the area of said polished optical fiber surface is smaller than the width of the opposite side surface.

2. An optical fiber coupler comprising two polished substrates each of which comprises a grooved substrate having a polished surface on the open side end thereof and adapted to hold therein an optical fiber and an optical fiber comprising a core, a cladding and two stress-applying parts arranged in the cladding so as to sandwich the core, a part of the optical fiber being polished off such that the polished surface of the fiber is close to the core so as to allow leakage of light power propagating in the core to the outside, the polished optical fiber embedded in the grooved substrate and fixed thereto in such a manner that the polished surface of the grooved substrate is in flush with the polished surface of the polished optical fiber, with the two polished substrates being in close contact with each other at the polished surfaces thereof to allow coupling of light power, wherein the grooved substrate is substantially T-shaped in cross-section in a plane perpendicular to a longitudinal axis and has a groove formed in a protruding portion of the T-shape.

3. An optical fiber coupler comprising a set of coupler halves, each comprising:
(a) a substrate having a polished one side surface with a groove opening formed therein and adapted to hold an optical fiber therein, and
(b) a polished optical fiber portion comprising a core, a cladding and a single stress-applying part arranged in said cladding, wherein said polished optical fiber portion is formed by providing an optical fiber comprising a core, a cladding and two stress-applying parts arranged in the cladding to sandwich the core, and polishing the optical fiber to remove a part of said cladding and the entire part of one of said stress-applying parts over a predetermined length of said optical fiber to form a polished surface at which there is leakage of light power propagating in the core to the outside,
wherein said polished optical fiber portion is embedded in said groove and fixed thereto, with the single stress-applying part facing a bottom portion of the groove and with the polished surface of said substrate flush with the polished surface of said polished optical fiber portion and perpendicular with an imaginary axis passing through the center of the said core and the center of said single stress-applying part,
wherein said set of coupler halves are attached to each other with the flush polished surfaces thereof in contact to allow coupling of light power, and wherein said stress-applying part comprises a central part and a refractive index controlling part surrounding said central part.

4. The optical fiber coupler as claimed in claim 3, wherein one of said coupler halves is fixed to a stationary member and another of said coupler halves is fixed to a movable member and means operatively connecting said stationary member and said movable member to dispose said flush polished surfaces of said coupler halves in slidable contact with each other to allow relative movement therebetween.

5. An optical fiber coupler comprising a set of coupler halves, each comprising:
(a) a substrate having a polished one side surface with a groove opening formed therein and adapted to hold an optical fiber therein, and
(b) a polished optical fiber portion comprising a core, a cladding and a single stress-applying part arranged in said cladding, wherein said polished optical fiber portion is formed by providing an optical fiber comprising a core, a cladding and two stress-applying parts arranged in the cladding to sandwich the core, and polishing the optical fiber to remove a part of said cladding and the entire part of one of said stress-applying parts over a predetermined length of said optical fiber to form a polished surface at which there is leakage of light power propagating in the core to the outside,
wherein said polished optical fiber portion is embedded in said groove and fixed thereto, with the single stress-applying part facing a bottom portion of the groove and with the polished surface of said substrate flush with the polished surface of said polished optical fiber portion and perpendicular with an imaginary axis passing through the center of the said core and the center of said single stress-applying part,
wherein said set of coupler halves are attached to each other with the flush polished surfaces thereof in contact to allow coupling of light power, and wherein said stress-applying part has a refractive index equal to that of said cladding and said optical fiber includes in said cladding at least one marker part having a refractive index different from that of said cladding.

6. The optical fiber coupler as claimed in claim 5, wherein one of said coupler halves is fixed to a stationary member and another of said coupler halves is fixed to a movable member and means operatively connecting said stationary member and said movable member to dispose said flush polished surfaces of said coupler halves in slidable contact with each other to allow relative movement therebetween.

7. An optical fiber coupler comprising a set of coupler halves, each comprising:
(a) a substrate having a polished one side surface with a groove opening formed therein and adapted to hold an optical fiber therein, and
(b) a polished optical fiber portion comprising a core, a cladding and a single stress-applying part arranged in said cladding, wherein said polished optical fiber portion is formed by providing an optical fiber comprising a core, a cladding and two stress-applying parts arranged in the cladding to sandwich the core, and polishing the optical fiber to remove a part of said cladding and the entire part of one of said stress-applying parts over a predetermined length of said optical fiber to form a polished surface at which there is leakage of light power propagating in the core to the outside, wherein said polished optical fiber portion is embedded in said groove and fixed thereto, with the single stress-applying part facing a bottom portion of the groove and with the polished surface of said substrate flush with the polished surface of said polished optical fiber portion and perpendicular with an imaginary axis passing through the center of the said core and the center of said single stress-applying part, wherein said set of coupler halves are attached to each other with the flush polished surfaces thereof in contact to allow coupling of light power, and wherein one of said coupler halves is fixed to a stationary member and another of said coupler halves is fixed to a movable member and means operatively connecting said stationary member and said movable member to dispose the flush polished surfaces of said coupler halves in slidable contact with each other to allow relative movement therebetween.

8. A stress-applying polarization maintaining optical fiber coupler comprising two substrates each having a polished surface with a groove therein adapted to hold an optical fiber therein and an optical fiber comprising a core and a cladding surrounding the core, wherein a part of the optical fiber is polished off to form a polished surface sufficiently close to the core to allow leakage of light power propagating in the core to the outside, wherein the optical fiber is embedded in the groove and fixed thereto to dispose the polished surface of the substrate flush with the polished surface of the optical fiber, wherein the flush surface of the two substrates are in close contact with each other to allow coupling of light power, wherein the optical fiber coupler is attached to a sliding device comprising a fixed member and a movable member and one of the optical fibers is fixed to the fixed member and the other is fixed to the movable member, wherein the movable member is in slidable contact with the fixed member and is slidable in the direction of the fiber axis and wherein the fixed and movable members comprise glass blocks and the sliding device further comprises a rail to which the fixed glass block is connected, and a slider slidably mounted on the rail and fixed to the movable glass block.

9. An optical fiber coupler comprising a set of coupler halves, each comprising:
(a) a substrate having a polished one side surface with a groove opening formed therein and adapted to hold an optical fiber therein, and
(b) a polished optical fiber portion comprising a core, a cladding and a single stress-applying part arranged in said cladding, wherein said polished optical fiber portion is formed by providing an optical fiber comprising a core, a cladding and two stress-applying parts arranged in the cladding to sandwich the core, and polishing the optical fiber to remove a part of said cladding and the entire part of one of said stress-applying parts over a predetermined length of said optical fiber to form a polished surface at which there is leakage of light power propagating in the core to the outside, wherein said polished optical fiber portion is embedded in said groove and fixed thereto, with the single stress-applying part facing a bottom portion of the groove and with the polished surface of said substrate flush with the polished surface of said polished optical fiber portion and perpendicular with an imaginary axis passing through the center of the said core and the center of said single stress-applying part, wherein said set of coupler halves are attached to each other with the flush polished surfaces thereof in contact to allow coupling of light power, and wherein each substrate has a side surface opposite the polished one side surface and the area of the entire polished surface of each of said coupler halves inclusive of the area of said polished one side substrate surface and the area of said polished optical fiber surface is smaller than the area of the opposite side surface.

10. The optical fiber coupler according to claim 9, wherein the width, perpendicular to the longitudinal direction of the optical fiber, of the polished one side surface is smaller than the width of the opposite side surface.

11. A process for manufacturing a stress-applying polarization-maintaining optical fiber coupler, comprising: providing a stress-applying polarization-maintaining optical fiber comprising a core in the center of the fiber, a cladding surrounding the core and a pair of first and second stress-applying parts arranged in the cladding so as to sandwich the core, wherein said first stress-applying part has a refractive index substantially equal to that of the cladding and the second stress-applying part has a refractive index different from that of the cladding, providing a substrate with a groove in one side surface, the groove adapted for holding therein the optical fiber and having a bottom wall and a top opening, inserting the optical fiber in the groove, adjusting the position of the optical fiber in the groove to dispose the first stress-applying part facing the bottom wall of the groove and the second stress-applying part facing the top opening of the groove, fixing said optical fiber to the substrate in the adjusted position to form a coupler half precursor, polishing each coupler half precursor in the direction from the top opening to the bottom wall of the groove to remove the second stress-applying part and expose a portion of the cladding positioned close to the core, to form two polished coupler halves each having a polished surface substantially perpendicular to an imaginary axis passing through the center of the core and the center of the first stress-applying part, and connecting the two polished coupler halves in contact with each other on the polished surfaces thereof to form an optical fiber coupler.

* * * * *